United States Patent
Dandach et al.

(10) Patent No.: US 9,705,726 B2
(45) Date of Patent: Jul. 11, 2017

(54) ESTIMATION OF A TIME, PHASE AND FREQUENCY SHIFT OF AN OQAM MULTICARRIER SIGNAL

(75) Inventors: Youssef Dandach, Chatillon (FR);
Pierre Siohan, Rennes (FR)

(73) Assignee: ORANGE, Paris (FR)

(*) Notice: Subject to any disclaimer, the term of this patent is extended or adjusted under 35 U.S.C. 154(b) by 0 days.

(21) Appl. No.: 14/129,739

(22) PCT Filed: Jun. 28, 2012

(86) PCT No.: PCT/FR2012/051497
§ 371 (c)(1),
(2), (4) Date: Dec. 27, 2013

(87) PCT Pub. No.: WO2013/001243
PCT Pub. Date: Jan. 3, 2013

(65) Prior Publication Data
US 2014/0153675 A1    Jun. 5, 2014

(30) Foreign Application Priority Data

Jun. 30, 2011 (FR) ..................... 11 55867
Nov. 8, 2011 (FR) ..................... 11 60177

(51) Int. Cl.
*H04L 27/26* (2006.01)

(52) U.S. Cl.
CPC ........ *H04L 27/2698* (2013.01); *H04L 27/264* (2013.01); *H04L 27/2631* (2013.01); *H04L 27/2649* (2013.01); *H04L 27/2684* (2013.01)

(58) Field of Classification Search
CPC . H04L 27/2698; H04L 27/2649; H04L 27/38; H04L 27/2655; H04L 27/2684; H04L 27/2656; H04L 27/2657; H04L 27/2659; H04L 27/266; H04L 27/2662; H04L 27/2671; H04L 27/2631; H04L 27/264
(Continued)

(56) References Cited

U.S. PATENT DOCUMENTS

2014/0064407 A1    3/2014    Dandach et al.

OTHER PUBLICATIONS

Mattera et al., "Preamble-Based Synchronization for OFDM/OQAM Systems," 19th European Signal Processing Conference, EUSIPCO 2011, pp. 1598-1602.*
(Continued)

*Primary Examiner* — Betsy Deppe
(74) *Attorney, Agent, or Firm* — David D. Brush; Westman Champlin & Koehler, P.A.

(57) ABSTRACT

A method is provided for receiving an OQAM multi-carrier signal, which implements a step of estimating, in the time domain, at least one time, phase, and/or frequency shift of the multi-carrier signal. The estimation step implements at least one estimator in order to estimate the time shift, referred to as a time estimator, and/or at least one estimator for estimating the phase shift, referred to as a phase estimator, and/or at least one estimator for estimating the frequency shift, referred to as a frequency estimator. The multi-carrier signal includes at least one preamble, and at least one of the estimators takes into account coefficients of a prototype filter used in transmission in order to shape at least one preamble inserted into the multi-carrier signal.

12 Claims, 6 Drawing Sheets

(58) Field of Classification Search
USPC ........ 375/260, 261, 340, 344, 354, 362, 365
See application file for complete search history.

(56) References Cited

OTHER PUBLICATIONS

International Search Report and Written Opinion dated Oct. 16, 2012 for corresponding International Application No. PCT/FR2012/051497, filed Jun. 28, 2012.
International Preliminary Report on Patentability and English translation of the Written Opinion dated Jan. 7, 2014, for corresponding International Application No. PCT/FR2012/051497, filed Jun. 28, 2012.
French Search Report and Written Opinion dated Mar. 13, 2012 for corresponding French Application No. 1155867, filed Jun. 30, 2011.
Fusco T. et al., "A Data-Aided Symbol Timing Estimation Algorithm for OFDM/OQAM Systems", Communications, 2009, ICC '09. IEEE International Conference on, IEEE Piscataway, NJ, USA, Jun. 14, 2009 (Jun. 14, 2009), pp. 1-5, XP031505563.
Fusco T. et al., "Data-Aided Symbol Timing and CFO Synchronization for Filter Bank Multicarrier Systems", IEEE Transactions on Wireless Communications, IEEE Service Center, Piscataway, NJ, US, vol. 6, No. 5, May 1, 2009 (May 1, 2009), pp. 2705-2715, XP011257595.

Siohan et al., "Analysis of OFDM/OQAM systems based on the filterbank theory", IEEE Transactions on Signal Processing, vol. 50, May 2002, pp. 1170-1183.
Siclet et al. "Design of BFDM/OQAM systems based on biorthogonal modulated filter banks", Proc. GLOBECOM'00, San Francisco, USA, Nov. 2000, pp. 701-705.
Jahan, B. et al., "Full Synchronization Method for OFDM/OQAM abd OFDM/QAM Modulations" in Proc. International Symposium on Spread Spectrum Techniques and Applications (ISSSTA'08), Bologna, Italy, Aug. 2008, pp. 344-348.
Fusco, T. et al., "Blind Symbol Timing Estimation of OFDM/OQAM Systems" ISCCSP 2008, Malta, Mar. 12-14, 200/, pp. 917-921.
Stitz, T. et al., "Practical Issues in Frequency Domain Synchronization for Filter Bank Based Multicarrier Transmission", in 3rd International Symposium on Communications, Control and Signal Processing, 2008. ISCCSP 2008, Mar. 2008, pp. 411-416.
Ma, Y. H. et al., "Preformance Analysis of OFDM Systems for Broadband Power Line Communications Under Impulsive Noise and Multipath Effects," IEEE Trans. Pwer Del., vol. 50, No. 2, pp. 674-682, Apr. 2005.
Pinchon, D. et al., "A Fast Design Method for Orthogonal Modulated Filter Banks", in Proc. International Conference on Acoustics, Speech and Signal Processing, Orlando, Florida, May 2002.
Lele, C. et al., "2 dB Better Than CP-OFDM with OFDM/OQAM for Preamble-Based Channel Estimation", in ICC, May 2008.

* cited by examiner

ESTIMATION OF A TIME, PHASE AND FREQUENCY SHIFT OF AN OQAM MULTICARRIER SIGNAL

1. CROSS-REFERENCE TO RELATED APPLICATIONS

This Application is a Section 371 National Stage Application of International Application No. PCT/FR2012/051497, filed Jun. 28, 2012, which is incorporated by reference in its entirety and published as WO 2013/001243 on Jan. 3, 2013, not in English.

2. FIELD OF THE INVENTION

The field of the invention is that of digital communications.

More specifically, the invention pertains to the transmission of OFDM/OQAM (Orthogonal Frequency Division Multiplexing/Offset Quadrature Amplitude Modulation) or BFDM/OQAM (Biorthogonal Frequency Division Multiplexing/Offset Quadrature Amplitude Modulation) signals for which the carriers are shaped by a prototype filter.

Yet more specifically, the invention pertains to the synchronization of the receivers and especially to the estimation of phase and/or time and/or frequency shifts, these shifts being introduced by the transmission channel and/or the transmission system and affecting such multicarrier signals.

The invention finds application especially in the field of wireless communications (DAB, DVB-T, WLAN, non-guided optics, etc) or wireline communications (xDSL, PLC, optical communications, etc).

3. PRIOR ART

The techniques of multicarrier transmission have numerous advantages, especially in the context of multipath channels. Thus, OFDM type modulations are particularly well suited to countering the effects of fading in frequency-selective channels.

However, these OFDM modulations have the drawback of generating a multicarrier signal with poor frequency localizing, and therefore require the insertion of a guard interval in the time domain to limit the interference. Now, the insertion of a guard interval of this kind reduces the spectral efficiency of the multicarrier signal.

Alternative solutions have then been proposed to limit the interference while at the same time removing the need to insert a guard interval. These techniques rely on the shaping of the signal by filters (for a discretized signal) or functions (for a continuous signal), called prototypes enabling better frequency localization through properties of orthogonality restricted to the real-value field. These are for example OFDM/OQAM or BFDM/OQAM type modulations conventionally used for radiofrequency communications as described especially in the documents by P. Siohan and N. Lacaille, "*Analysis of OFDM/OQAM systems based on the filterbank theory*", Proc. GLOBECOM'99, Rio de Janeiro, Brazil, December 1999, pp. 2279-2284, and C. Siclet and P. Siohan, "Design *of BFDM/OQAM systems based on biorthogonal modulated filter banks*", Proc. GLOBECOM'00, San Francisco, USA, November 2000, pp. 701-705.

FIG. 1 provides a more precise illustration of the scheme of an OFDM/OQAM modulator 10 delivering an OFDM/OQAM type multicarrier signal. Such a signal can be represented in a baseband and in discrete time in the following form:

$$s[k] = \sum_{m=0}^{M-1} \sum_{n=-\infty}^{n=+\infty} a_{m,n} h\left[k - n\frac{M}{2}\right] e^{j\frac{2\pi}{M}m(k-D/2)} e^{j\phi_{m,n}}$$

with:
$a_{m,n}$ a data symbol with a real value to be transmitted on a sub-carrier m at the instant n;
M the number of carrier frequencies (N=M/2 a discrete time shift)
h[n] the prototype filter used by the modulator, with a length L;
D the time lag introduced by the prototype filter;
$\phi_{m,n}$ a phase term chosen so as to achieve an alternation between real part and imaginary part enabling orthogonality, for example equal to $$\frac{\pi}{2}(n+m) + \varepsilon\pi mn$$

with $\varepsilon=\{0,\pm1\}$;
k corresponds to the instant kTs, with Ts the sampling period.

In the case of an orthogonal OFDM/OQAM modulation, the time lag D is such that D=L−1, with L the length of the prototype filter. In the case of a biorthogonal BFDM/OQAM modulation, the time lag D can be chosen more flexibly and can be such that D≤L−1.

As illustrated in FIG. 1, the real-value data symbols $a_{m,n}^p$ undergo pre-processing or pre-modulation 11, making it possible especially to ensure a quadrature operation, in time and in frequency, of the carriers of the multicarrier signal.

More specifically, during this pre-processing operation, the real-value data symbols $a_{m,n}$ are multiplied by a first phase term in π/2 providing for a time and frequency phase shift of the carriers of the multicarrier signal, and by a second term making it possible to take account of the length of the prototype filter. The data symbols obtained at the output of this pre-processing module denoted as $a_{m,n}^p$ can be expressed in the following form:

$$a_{m,n}^p = a_{m,n} e^{j\frac{\pi}{2}n} M e^{-j\frac{\pi}{2}m\frac{D-M/2}{M/2}}.$$

These data symbols are then converted from the frequency domain into the time domain by conventionally using an inverse discrete Fourier transform (IDFT), sized M in an IDFT module 12. The transformed signals obtained at output of the IDFT module 12, denoted as $u_{0,n}$ to $u_{M-1,n}$ are then filtered by the prototype filter h[n] 13, and then oversampled and shifted to obtain the multicarrier signal OFDM/OQAM s[k]. More specifically, the prototype filter h[n] can be expressed in its polyphase form, comprising M polyphase components $G_l(z)$, defined by:

$$G_l(z) = \sum_n h[l+nM]z^{-n}.$$

However, despite the gain, in terms of spectral efficiency, offered by OQAM (OFDM/OQAM or BFDM/OQAM) type modulations as compared with OFDM type modulations because they remove the need for inserting a guard interval or a cyclic prefix, OFDM modulations are often preferred because they are simpler to implement.

In particular, at reception, the presence of a cyclic prefix for OFDM modulations gives the operation for synchronizing the receivers an operation of low complexity owing to the correlation of such a prefix created between the start and the end of each OFDM multicarrier symbol.

The absence of such a guard interval for OQAM type multicarrier modulations makes the synchronization operation more complex and can require either the introduction of pieces of additional data, called pilot data, which take the form of a preamble at the start of a frame or the form of isolated data distributed in the frame, or costly computations in the case of blind synchronization.

3.1 Prior Art on the Estimation of a Time and/or Phase Shift

In particular, in the case of a transmission system using pilots, the synchronization operation is implemented in carrying out a correlation of the multicarrier signal received in the time domain. This correlation can, for example, be created from deterministic pilots grouped together in the form of preambles or again from distributed pilots based on pseudo-random sequences.

The document by T. Fusco, A. Petrella, and M. Tanda, "*A data-aided symbol timing estimation algorithm for OFDM/OQAM systems*", proposes especially a technique for estimating a time and/or phase shift of an OFDM/OQAM receiver based on the use of a preamble.

Although this technique offers efficient results in terms of performance and complexity, it dictates the use of a specific preamble, in which the odd-parity carriers are zero, to set up a relationship between the samples of the multicarrier signal. In particular, this relationship is obtained for a non-causal transmission system and is therefore hard to implement. The outputs of the inverse Fourier transform step, for this specific preamble, are therefore linked, like those of an inverse Fourier transform, with the real inputs and, consequently, a prototype filter of odd-parity length is required to preserve these relationships after filtering.

Another drawback is that the duration of the preamble increases with the length of the prototype filter reducing the spectral efficiency for lengthy prototype filters.

3.2 Prior Art Pertaining to the Joint Estimation of Time and Frequency Shift

The document by T. Fusco, L. Izzo, A. Petrella, and M. Tanda, "*A data-aided symbol timing and CFO synchronization for filter bank multicarrier systems*", proposes especially a technique for estimating time and frequency shifts of an OFDM/OQAM receiver, also based on the use of a preamble. In particular, this technique, used in the time domain, is based on the creation of a periodicity at the output of the modulator.

Although this technique offers efficient results in terms of performance and complexity, it dictates the use of a specific preamble, the duration of which is greater than the duration of a symbol M. In particular, the duration of the preamble used is at least equal to 2M modulated signal samples (i.e. three real data symbols at transmission). The outputs of the inverse Fourier transform step, for this specific preamble, are therefore linked, like those of an inverse Fourier transform, with real inputs and therefore the duration of the preamble used is three times greater than the length (L=M) of the prototype filter used.

Another drawback is that the duration 3M of the preamble creates a periodicity of M, so much so that the frequency synchronization can be provided unambiguously only if $|M\Delta f|<\frac{1}{2}$, with $M\Delta f=\Delta v$ representing a standardized frequency shift, and thus the estimation of the frequency shift can only be performed on a relatively limited frequency range.

There is therefore a need for a novel technique for transmitting OFDM/OQAM or BFDM/OQAM type multicarrier signals making it possible to simplify the operation of synchronization of the receivers as compared with the prior-art techniques for the estimation of phase and/or time shifts and/or the joint estimation of a time shift and a frequency shift, these shifts being introduced by the transmission channel and/or the transmission system and affecting such multicarrier signals.

4. SUMMARY OF THE INVENTION

An exemplary embodiment of the present invention relates to a method for receiving an OQAM type multicarrier signal implementing a step for estimating, in the time domain, at least one time, phase and/or frequency shift of the multicarrier signal, implementing at least one estimator for estimating the time shift, called a time estimator, and/or at least one estimator for estimating the phase shift, called a phase estimator, and/or at least one estimator for estimating the frequency shift, called a frequency estimator.

According to the invention, at least one of the estimators takes account of the coefficients of a prototype filter used at transmission to shape at least one preamble inserted into said multicarrier signal.

Thus, the invention relies on a novel and inventive approach to the synchronization of the receivers used to demodulate OFDM/OQAM or BFDM/OQAM type multicarrier signals, more generally called OQAM multicarrier signals, having lower complexity than that of the prior-art techniques.

In particular, the use of such estimators taking account of the prototype filter applied to the preamble reduces the complexity of the estimation step by half, it being possible for an estimator according to the invention to be limited to carrying out a sum on M/4 terms for the joint estimation of a shift in time and/or in phase whereas an estimator according to the prior art, as described in the first of the Fusco documents mentioned here above, makes it necessary especially to carry out a sum on M/2 terms with M the number of sub-carriers of an OQAM multicarrier symbol of the multicarrier signal.

Besides, for the joint estimation of a time and/or frequency shift, according to the prior art, the periodicity created by the preamble used is equal to M, i.e. the frequency synchronization cannot be provided without ambiguity unless $|M\Delta f|<\frac{1}{2}$. Besides, the method requires a complexity of computation according to a sum of at least M+1 terms.

On the contrary, the invention reduces the duration of the preamble to the duration of a symbol M while at the same time enabling a frequency estimation on a frequency band that is twice as big and a complexity of computation reduced to M/2 terms.

Indeed, in the Fusco document pertaining to the joint estimation of time and frequency shifts, the duration of the preamble sent to create the periodicity is longer than that of the prototype filter.

In addition, such a method for receiving makes it possible to take account of the causality of the prototype filter. A receiver implementing such a reception technique is thus physically achievable since it is based on the use of a causal prototype filter.Now, in the above-mentioned Fusco documents, the modulation scheme proposed is non-causal. In other words, the time lag parameter D is not taken into consideration and, therefore, the relationships of conjugation at the output of the frequency/time transformation step are identical to those of a frequency/time transformation with real inputs if the odd-parity (or even-parity) carriers are modulated by a zero value.

In particular, the duration of the preamble of the multi-carrier signal depends on the estimator according to the invention as well as the prototype filter length used at transmission. In order to prevent a lengthening of the duration of the preamble, it is possible to switch over between two prototype filters. In other words, different prototype filters can be used at transmission, one to shape the preamble and the other to shape the payload part of the multi-carrier signal. Thus, it is possible to use a very short prototype filter to shape the preamble used for the synchronization (for example with a length L=M, making it possible to generate a preamble formed by a single OQAM multi-carrier signal for example), and a lengthier prototype filter for the payload part. It is also possible to use a lengthier prototype filter to shape the preamble, for example the length L=qM, with q an integer greater than 1. In this case, it may be necessary to add one or more columns of zero-preamble symbols in the preamble, before the payload data.

As described in detail here below, it must be noted that the joint estimation of phase, and a frequency, and time shift is made possible by taking account of the coefficients of a prototype filter used at transmission for the shaping of particular preambles.

According to one particular aspect of the invention, at least one of the estimators implements a pseudo-periodicity taking account of said preamble and of said prototype filter.

This aspect has the advantage of reducing the complexity of computations implemented by the estimator.

According to one particular aspect of the invention, the step for estimating implements, in the time domain, a first sub-step for estimating a timeshift followed by a second sub-step for estimating a phase shift or a second sub-step for estimating a frequency shift.

Indeed, according to a first embodiment of the invention, the step for estimating implements, in the time domain, a first sub-step for estimating a time shift followed by a second sub-step for estimating a phase shift.

According to one particular aspect pertaining to the first embodiment implementing an estimation of a time and phase shift, the invention proposes an approach to the joint estimation of a time shift and a phase shift. To achieve this goal, the invention implements two successive sub-steps of estimation, the first delivering an estimation of the time shift and the second using the result of the first to deliver the estimation of a phase shift.

According to a second embodiment of the invention, the step for estimation implements, in the time domain, a first sub-step for estimating a time followed by a second sub-step for estimating a frequency shift.

Indeed, the synchronization amounts to estimating the time delay as well as the frequency shift introduced at the demodulator relative to the modulator.

According to this particular aspect pertaining to the second embodiment, the invention proposes an approach to the joint estimation of a time shift and a frequency shift. To achieve this goal, the invention implements two successive sub-steps of estimation, the first delivering an estimation of the time shift and the second using the result of the first to deliver the estimation of a frequency shift.

According to another aspect of the invention pertaining to the first embodiment, the time estimator implements the first sub-step for estimating a time shift according to one of the following equations:

$$\hat{\tau}_{LS_1} = \underset{\tilde{\tau}}{\mathrm{argmax}} \left| \sum_{k=0}^{M/4-1} h(k)h(M/2-1-k)r(k+\tilde{\tau})r(M/2-1-k+\tilde{\tau}) \right|$$

and $$\hat{\tau}_{LS_2} = \underset{\tilde{\tau}}{\mathrm{argmax}} \left| \sum_{k=0}^{M/4-1} h(M-1-k)h(M/2+k)r(M/2+k+\tilde{\tau})r(M-1-k+\tilde{\tau}) \right|$$

and/or the phase estimator implements the second sub-step for estimating a phase shift according to one of the following equations:

$$\hat{\phi}_{LS_1} = \frac{1}{2} \angle \left\{ \sum_{k=0}^{M/4-1} h(k)h(M/2-1-k)r(k+\hat{\tau})r(M/2-1-k+\hat{\tau}) \right\}$$

and $$\hat{\phi}_{LS_2} = \frac{1}{2} \angle \left\{ \sum_{k=0}^{M/4-1} h(M-1-k)h(M/2+k)r(M/2+k+\hat{\tau})r(M-1-k+\hat{\tau}) \right\}$$

with:
$\hat{\tau}_{LS_1}$ or $\hat{\tau}_{LS_2}$ the estimation of said time shift at output of said time estimator, and $\hat{\tau}$ the estimation of the time shift fixed at input of the estimator of the phase shift;
$\hat{\phi}_{LS_1}$ or $\hat{\phi}_{LS_2}$ the estimation of said phase shift at output of said phase estimator;
$\angle\{.\}$ the argument of a complex number;
M the number of sub-carriers of an OQAM symbol of said multicarrier signal;
k an integer such that $0 \leq k \leq M/4-1$;
$\tilde{\tau}$ an integer such that $0 \leq \tilde{\tau} \leq \tilde{\tau}_{max}$ with $\tilde{\tau}_{max}$ a maximum predetermined value of $\tilde{\tau}$;
h(k) coefficients of said prototype filter used at transmission;
r(k) a received multicarrier signal such that $r(k)=s(k-\tau)e^{j\phi}+b(k)$;
s(k) a sent multicarrier signal;
b(k) a Gaussian white noise;
$\tau$ said time shift of the received multicarrier signal relative to said sent multicarrier signal;
$\phi$ said phase shift of the received multicarrier signal relative to said sent multicarrier signal.

The time and phase estimators proposed therefore rely on knowledge of the prototype filter used at transmission to shape the preamble, and make it possible to reduce the complexity of computation of the estimations of the time shift and/or phase shift owing to the relationships of symmetry obtained at output of the module for the frequency/time transformation of the OQAM multicarrier signal.

According to one particular characteristic of the invention pertaining to the first embodiment, the step for estimating also takes account of the position of at least one pair of maximum values obtained, at transmission, for the multi-carrier signal, said position being defined relative to the outputs of a step for transformation, from the frequency domain into the time domain, of a set of data symbols forming the preamble, called preamble symbols.

Indeed, the inventors of the present patent application have shown special relationships of conjugation between the different outputs of the step for transformation from the frequency domain to the time domain implemented at transmission (for example by an inverse fast Fourier transform). Owing to the nature of the OQAM multicarrier signal and these relationships of conjugation, a "pseudo-periodicity" is shown in the multicarrier signal, at output of the modulator, which is exploited at reception.

The estimation of the phase and/or time shifts according to the invention can be performed more speedily and more simply.

In particular, the method for receiving according to the invention can include a step for eliminating time samples, from the multicarrier signal, that have an amplitude below a predetermined threshold, implemented prior to the estimation step.

In this way, it is possible to eliminate the samples of low value from the received multicarrier signal, these samples being highly disturbed by the transmission channel. Then, it is only the samples of the received multicarrier signal corresponding to the peak values obtained at output of the frequency/time transform module that are kept, these samples being little affected by the noise and the channel.

Knowing the positions of these peak or maximum values, it is possible to define simplified time and/or phase estimators for the estimation step.

According to a first example of the first embodiment, for preamble symbols $p_{m,n}$ defined at input of the step for transforming from the frequency domain to the time domain implemented, at transmission, by:

$$\begin{cases} p_{m,n} = \sqrt{2}/2 & \text{for } m = 4p \text{ and } m = 1 + 4p \\ p_{m,n} = -\sqrt{2}/2 & \text{for } m = 2 + 4p \text{ and } m = 3 + 4p \end{cases} \text{ and}$$

with $p_{m,n}$ a preamble symbol associated with a sub-carrier with index m at the instant n, p an integer,
and $0 \le m \le M-1$,
the time estimator implements the first sub-step for estimating a time shift according to one of the following equations:

$$\hat{\tau}_{LS_1} = \underset{\tilde{\tau}}{\operatorname{argmax}} |r(\tilde{\tau})r(M/2 - 1 + \tilde{\tau})|,$$

$$\hat{\tau}_{LS_2} = \underset{\tilde{\tau}}{\operatorname{argmax}} |r(M/2 + \tilde{\tau})r(m - 1 + \tilde{\tau})|,$$

with:
$\hat{\tau}_{LS_1}$ or $\hat{\tau}_{LS_2}$ the estimation of said time shift at output of said time estimator;
M the number of sub-carriers of an OQAM symbol of said multicarrier signal;
$\tilde{\tau}$ an integer such that $0 \le \tilde{\tau} \le \tilde{\tau}_{max}$ with $\tilde{\tau}_{max}$ a predetermined maximum value of $\tilde{\tau}$;
r(k) a received multicarrier signal such that $r(k)=s(k-\tau)e^{j\phi}+b(k)$;
k an integer, for example $0 \le k \le M/2$;
s(k) a sent multicarrier signal;
b(k) a Gaussian white noise;
τ a time shift of the received multicarrier signal relative to the sent multicarrier signal;

φ a phase shift of the received multicarrier signal relative to the sent multicarrier signal.

According to a second example of the first embodiment, for preamble symbols $p_{m,n}$ defined at input of the step of transformation from the frequency domain to the time domain implemented at transmission by:

$$\begin{cases} p_{2m,n} = \sqrt{2}/2 \\ p_{2m+1,n} = j\sqrt{2}/2 \end{cases} \text{ for } 0 \le m \le M/2 - 1$$

the time estimator implements the first sub-step for estimating a time shift according to one of the following equations:

$$\hat{\tau}_{LS_1} = \underset{\tilde{\tau}}{\operatorname{argmax}} |r(M/4 - 1 + \tilde{\tau})r(M/4 + \tilde{\tau})|,$$

$$\hat{\tau}_{LS_2} = \underset{\tilde{\tau}}{\operatorname{argmax}} |r(3M/4 - 1 + \tilde{\tau})r(3M/4 + \tilde{\tau})|,$$

with:
$\hat{\tau}_{LS_1}$ or $\hat{\tau}_{LS_2}$ the estimation of said time shift at output of said time estimator;
M the number of sub-carriers of an OQAM symbol of said multicarrier signal;
$\tilde{\tau}$ an integer such that $0 \le \tilde{\tau} \le \tilde{\tau}_{max}$ with $\tilde{\tau}_{max}$ a predetermined maximum value of $\tilde{\tau}$,
r(k) a received multicarrier signal such that $r(k)=s(k-\tau)e^{j\phi}+b(k)$;
k an integer, for example $0 \le k \le M/2$;
s(k) a sent multicarrier signal;
b(k) a Gaussian white noise;
τ a time shift of the received multicarrier signal relative to the sent multicarrier signal;
φ a phase shift of the received multicarrier signal relative to the sent multicarrier signal.

The preambles according to these two first examples are particularly worthwhile because they can be used for other functions, such as the channel estimation.

In particular, it is noted that it can be necessary to add one or more columns of zero preamble symbols in the preamble, before the payload part, such that $p_{m,n+1}=0$ for $0 \le m \le M-1$.

The adding of these zero columns of preamble symbols is optional for the time estimators according to the first equation ($\hat{\tau}_{LS_1}$), and depends in this case on the length of the prototype filter used, at transmission, to shape the preambles. Thus, for a prototype filter with a length L=M, a single preamble column (formed by preamble symbols at the instant n) gives good performance but for a prototype filter of greater length, for example L>2M, it is possible to add columns of zero data (formed by zero preamble symbols at the instants n+1, n+2, etc) to improve performance.

The adding of at least one column of zero preamble symbols is on the contrary necessary for time estimators according to the second equation ($\hat{\tau}_{LS_2}$).

According to a third example of the first embodiment, for preamble symbols $p_{m,n}$ defined at input of the step for transformation from the frequency domain to the time domain implemented at transmission by:

$$\begin{cases} p_{2m,n} = \sqrt{2}/2 \\ p_{2m+1,n} = 0 \end{cases} \text{ for } 0 \le m \le M/2 - 1$$

the time estimator implements the first sub-step for estimating a time shift according to one of the following equations:

$$\hat{\tau}_{LS_1} = \underset{\tilde{\tau}}{\mathrm{argmax}}\ |r(M/4-1+\tilde{\tau})r(M/4+\tilde{\tau})|,$$

$$\hat{\tau}_{LS_2} = \underset{\tilde{\tau}}{\mathrm{argmax}}\ |r(3M/4-1+\tilde{\tau})r(3M/4+\tilde{\tau})|,$$

$$\hat{\tau}_{LS_3} =$$
$$\underset{\tilde{\tau}}{\mathrm{argmax}}\ |r(M/4-1+\tilde{\tau})r(3M/4+\tilde{\tau})+r(M/4+\tilde{\tau})r(3M/4-1+\tilde{\tau})|,$$

with:
$\hat{\tau}_{LS_1}, \hat{\tau}_{LS_2}$ or $\hat{\tau}_{LS_3}$ the estimation of said time shift at output of said time estimator;
M the number of sub-carriers of an OQAM symbol of said multicarrier signal;
$\tilde{\tau}$ an integer such that $0 \leq \tilde{\tau} \leq \tilde{\tau}_{max}$ with $\tilde{\tau}_{max}$ a predetermined maximum value of $\tilde{\tau}$,
r(k) a received multicarrier signal such that $r(k)=s(k-\tau)e^{j\phi}+b(k)$;
k an integer, for example $0 \leq k \leq M/2$;
s(k) a sent multicarrier signal;
b(k) is a Gaussian white noise;
$\tau$ a time shift of the received multicarrier signal relative to the sent multicarrier signal;
$\phi$ a phase shift of the received multicarrier signal relative to the received multicarrier signal.

According to a fourth example of the first embodiment, for preamble symbols $p_{m,n}$ defined at the input of the step for transformation from the frequency domain to the time domain implemented at transmission by:

$$\begin{cases} p_{2m,n} = (-1)^m \sqrt{2}/2 \\ p_{2m+1,n} = 0 \end{cases} \text{for } 0 \leq m \leq M/2-1$$

the time estimator implements a first sub-step for estimating a time shift according to one of the following equations:

$$\hat{\tau}_{LS_1} = \underset{\tilde{\tau}}{\mathrm{argmax}}\ |r(\tilde{\tau})r(M/2-1+\tilde{\tau})|,$$

$$\hat{\tau}_{LS_2} = \underset{\tilde{\tau}}{\mathrm{argmax}}\ |r(M/2+\tilde{\tau})r(M-1+\tilde{\tau})|,$$

$$\hat{\tau}_{LS_3} = \underset{\tilde{\tau}}{\mathrm{argmax}}\ |r(\tilde{\tau})r(M-1+\tilde{\tau})+r(M/2-1+\tilde{\tau})r(M/2+\tilde{\tau})|,$$

with:
$\hat{\tau}_{LS_1}, \hat{\tau}_{LS_2}$ or $\hat{\tau}_{LS_3}$ the estimation of said time shift at output of said time estimator;
M the number of sub-carriers of an OQAM symbol of said multicarrier signal;
$\tilde{\tau}$ an integer such that $0 \leq \tilde{\tau} \leq \tilde{\tau}_{max}$ with $\tilde{\tau}_{max}$ a predetermined maximum value of $\tilde{\tau}$,
r(k) a received multicarrier signal such that $r(k)=s(k-\tau)e^{j\phi}+b(k)$;
k an integer, for example $0 \leq k \leq M/2$;
s(k) a sent multicarrier signal;
b(k) is a Gaussian white noise;
$\tau$ a time shift of the received multicarrier signal relative to the sent multicarrier signal;
$\phi$ a phase shift of the received multicarrier signal relative to the received multicarrier signal.

According to a fifth example of the first embodiment, for preamble symbols $p_{m,n}$ defined at input of the first step for transformation from the frequency domain to the time domain implemented, at transmission, by:

$$\begin{cases} p_{m,n} = 1 & \text{if mod}(m,4) = 0 \\ p_{m,n} = 0 & \text{else} \end{cases} \text{for } 0 \leq m \leq M/2-1$$

the time estimator implements the first sub-step for estimating a time shift according to one of the following equations:

$$\hat{\tau}_{LS_1} = \underset{\tilde{\tau}}{\mathrm{argmax}}\ |r(\tilde{\tau})r(M/2-1+\tilde{\tau})+r(M/4-1+\tilde{\tau})r(M/4+\tilde{\tau})|$$

$$\hat{\tau}_{LS_2} = \underset{\tilde{\tau}}{\mathrm{argmax}}\ |r(M/2+\tilde{\tau})r(M-1+\tilde{\tau})+r(3M/4-1+\tilde{\tau})r(3M/4+\tilde{\tau})|$$

$$\hat{\tau}_{LS_3} = \underset{\tilde{\tau}}{\mathrm{argmax}}\ |r(\tilde{\tau})r(M-1+\tilde{\tau})+r(M/4-1+\tilde{\tau})r(3M/+\tilde{\tau})+$$
$$r(M/4+\tilde{\tau})r(3M/4-1+\tilde{\tau})+r(M/2-1+\tilde{\tau})r(M/2+\tilde{\tau})|$$

with:
$\hat{\tau}_{LS_1}, \hat{\tau}_{LS_2}$ or $\hat{\tau}_{LS_3}$ the estimation of said time shift at output of said time estimator;
M the number of sub-carriers of an OQAM symbol of said multicarrier signal;
$\tilde{\tau}$ an integer such that $0 \leq \tilde{\tau} \leq \tilde{\tau}_{max}$ with $\tilde{\tau}_{max}$ a predetermined maximum value of $\tilde{\tau}$,
r(k) a received multicarrier signal such that $r(k)=s(k-\tau)e^{j\phi}+b(k)$;
k an integer, for example $0 \leq k \leq M/2$;
s(k) a sent multicarrier signal;
b(k) is a Gaussian white noise;
$\tau$ a time shift of the received multicarrier signal relative to the sent multicarrier signal;
$\phi$ a phase shift of the received multicarrier signal relative to the received multicarrier signal.

These three examples of the first embodiment consider a system of OQAM transmission implementing a number of carriers M that is a multiple of 4 and a time lag D such that D=qM−1

This makes it possible to obtain other particular relationships between the outputs of the step for transformation from the frequency domain to the time domain implemented at transmission and therefore further simplifies the estimators.

Again, as noted with reference to the first two examples, it can be necessary to add one or more columns of zero preamble symbols into the preamble, before the payload part, such that $p_{m,n+i}=0$ for $0 \leq m \leq M-1$ and i=1, 2, . . . . The addition of these zero preamble symbols is always optional for time estimators according to the first equation ($\hat{\tau}_{LS_1}$), but necessary for the time estimators according to the second equation ($\hat{\tau}_{LS_2}$) and the third equation ($\hat{\tau}_{LS_3}$).

According to a particular aspect of the second embodiment focused on the estimation of a time and frequency shift, the estimation step takes account of the fact that at least one of the preamble symbols appreciably comprises one in every two sub-carriers, having a zero value.

More specifically, for preamble symbols $p_{m,n}$, defined at input to the step for transformation from the frequency domain to the time domain, the first symbol sent at the instant n=0 being such that:

$$\begin{cases} p_{2m,0} = d \text{ with } d \in \mathfrak{R} \text{ or } d \in \mathcal{J} \\ p_{2m+1,0} = 0 \end{cases}$$

or $$\begin{cases} p_{2m,0} = 0 \\ p_{2m+1,0} = d \text{ with } d \in \mathfrak{R} \text{ or } d \in \mathcal{J} \end{cases}$$

with $p_{m,n}$ a preamble symbol associated with a sub-carrier with index m at the instant n=0, and $0 \le m \le M/2-1$, with M the number of sub-carriers of an OQAM symbol of the multicarrier signal;
while the following signal sent at the instant n=1 corresponds to a zero symbol such that: $p_{m,1}=0$, for $0 \le m \le M-1$ the time estimator can implement the first sub-step for estimating a time shift according to the following equation:

$$\hat{\tau}_{LS} = \underset{\tilde{\tau}}{\operatorname{argmax}} \{2|R_1(\tilde{\tau})| - Q_1(\tilde{\tau})\},$$

and the frequency estimator implements said second sub-step for estimating a frequency shift according to the following equation:

$$\Delta \hat{f}_{LS} = \frac{1}{\pi M} \arg \{R_1(\hat{\tau}_{LS})\},$$

with:

$$R_1(\tilde{\tau}) = \sum_{k=0}^{M/2-1} h(k)h(k+M/2)r*(k+\tilde{\tau})r(k+M/2+\tilde{\tau}),$$

$$Q_1(\tilde{\tau}) = \sum_{k=0}^{M/2-1} h(k)^2 |r(k+\tilde{\tau})|^2 + h(k+M/2)^2|r(k+M/2+\tilde{\tau})|^2,$$

$\hat{\tau}_{LS}$ is the estimation of the time shift at output of the time estimator;
$\Delta \hat{f}_{LS}$ is the estimation of said frequency shift at output of the phase estimator;
M is the number of sub-carriers of an OQAM signal of the multicarrier signal;
k is an integer such that $0 \le k \le M/2-1$;
$\tilde{\tau}$ is an integer such that $0 \le \tilde{\tau} \le \tilde{\tau}_{max}$ with $\tilde{\tau}_{max}$ a predetermined maximum value of $\tilde{\tau}$,
h(k) of the coefficients of said prototype filter used at transmission;
r(k) a received multicarrier signal such that $r(k)=e^{j2\pi\Delta f}[c(k) \otimes s(k-\tau)]+b(k)$ if the frequency shift comes into play for example at transmission. It is also possible to take account of the frequency phase shift introduced at reception;
⊗ is a product of convolution;
c(k) is a multipath channel;
s(k) a sent multicarrier signal;
b(k) is a Gaussian white noise;
τ a time shift of the received multicarrier signal relative to the sent multicarrier signal;
Δf a phase shift of the received multicarrier signal relative to the received multicarrier signal.

The proposed time and frequency estimators rely therefore on knowledge of the prototype filter used, at transmission, to shape the preamble, and they reduce the complexity of computation of the estimations of the time and frequency shift owing to the relationships of symmetry obtained at output of the module for frequency/time transformation of the OQAM multicarrier signal.

Furthermore, because of such symmetry, the time and frequency estimators according to the invention are based on the selection of a preamble such that half of the carriers are zero, the effect of which is to create a "pseudo-periodicity" at the output of the modulator.

The time and frequency estimation according to the invention can be distinguished from the time and frequency estimations according to the prior art as described in the Fusco document on the joint estimation of time and frequency shifts, in that the periodicity is not created by transmission of the same preamble during a certain period of time, but because of the relationships of symmetry obtained at output of the frequency/time transformation module of the OQAM multicarrier signal. This makes it possible to obtain a frequency synchronization on a frequency interval twice as great as that of the Fusco document pertaining to the joint estimation of the time and frequency shifts.

According to one particular example of the second embodiment, for preamble symbols $p_{m,n}$, defined at input of the first step for transformation from the frequency domain to the time domain, the first symbol sent at the instant n=0 such that:

$$\begin{cases} p_{2m,0} = d \text{ with } d \in \mathfrak{R} \text{ or } d \in \mathcal{J} \\ p_{2m+1,0} = 0 \end{cases}$$

or $$\begin{cases} p_{2m,0} = 0 \\ p_{2m+1,0} = d \text{ with } d \in \mathfrak{R} \text{ or } d \in \mathcal{J} \end{cases}$$

with $p_{m,n}$ a preamble symbol associated with a sub-carrier with index m at the instant n=0, and $0 \le m \le M/2-1$, with M the number of sub-carriers of an OQAM symbol of said multicarrier signal;
while the next symbol sent at the instant n=1 corresponds to a zero symbol such that:

$p_{m,1}=0$, for $0 \le m \le M-1$ the step for estimating takes account also of the position of at at least a pair of maximum values obtained, at transmission, for said multicarrier signal,
the position being defined relative to the outputs of a step of transformation, from the frequency domain to the time domain, of a set of data symbols intended to form said preamble, called preamble symbols.
The time estimator implements the first sub-step for estimating a time shift according to the following equation:

$$\hat{\tau}_{LS} = \underset{\tilde{\tau}}{\operatorname{argmax}} \{|R_1(\tilde{\tau})|Q_1(\tilde{\tau})\},$$

and the frequency estimator implements said second step for estimating a frequency shift according to the following equation:

$$\Delta \hat{f}_{LS} = \frac{1}{2\pi N} \arg \{R_1(\hat{\tau}_{LS})\},$$

with k an integer, M the number of sub-carriers of an OQAM symbol of said multicarrier signal, and said positions of maximum values as following: k, M/2−1−k, M/2+k, M−1−k:
$R(\tilde{\tau})=h(k)h(k+M/2)r^*(k+\tilde{\tau})r(k+M/2+\tilde{\tau})+h(M/2-1-k)h(M-1-k)r^*(M/2-1-k+\tilde{\tau})r(M-1-k+\tilde{\tau})Q(\tilde{\tau})=h(k+M/2)^2|r(k+\tilde{\tau})|^2+h(M-1-k)^2|r(M/2-1-k+\tilde{\tau})|^2+h(k)|r(M/2+k+\tilde{\tau})|^2h(M/2-1-k)^2|r(M-1-k+\tilde{\tau})|^{2}$, $\hat{\tau}_{LS}$ the estimation of said time shift at output of the time estimator;

$\Delta\hat{f}_{LS}$ the estimation of the frequency shift at output of the phase estimator;

M the number of sub-carriers of an OQAM signal of said multicarrier signal;

$\tilde{\tau}$ an integer such that $0 \leq \tilde{\tau} \leq \tilde{\tau}_{max}$ with $\tilde{\tau}_{max}$ a predetermined maximum value of $\tilde{\tau}$, h(k) coefficients of said prototype filter used at transmission; r(k) being a received multicarrier signal such that $r(k)=e^{j2\pi\Delta f}[c(k)\otimes s(k-\tau)]+b(k)$ if the frequency shift comes into play for example at transmission. It is also possible to take account of the frequency phase shift introduced at reception;

⊗ a product of convolution;
c(k) a multipath channel;
s(k) a sent multicarrier signal;
b(k) a Gaussian white noise;
τ the time shift of the received multicarrier signal relative to the sent multicarrier signal;
Δf the frequency shift of the received signal relative to said sent multicarrier signal.

As emphasized here above for time and phase estimators according to the first embodiment, the inventors of the present patent application have shown, in this embodiment, special relationships of conjugation between the different outputs of the step for transformation from the frequency domain to the time domain implemented at transmission (by an inverse fast Fourier transform for example). Owing to the nature of the OQAM multicarrier signal and these relationships of conjugation, a "pseudo-periodicity" is shown in the multicarrier signal at output of the modulator, which is exploited at reception.

The estimation of the time and/or frequency shifts according to the second embodiment of the invention can therefore be done more speedily and more simply.

In particular, the method for receiving according to the invention can comprise a step for eliminating, from the multicarrier signal, of time samples of low value, below a predetermined threshold, from the multicarrier signal, said step for eliminating being implemented preliminarily to the estimation step.

In this way, it is possible to not take account of the samples of the received multicarrier signal having a low value, these samples being highly disturbed by the transmission channel. The only samples kept are the samples of the received multicarrier signal corresponding to the peak values obtained at output of the frequency/time transform module, these samples being little affected by the noise and the channel.

Knowing the positions of these peak or maximum values corresponding for example to k, M/2−1−k, M/2+k, M−1−k, it is possible to define simplified time and frequency estimators for the estimation step.

It must be noted that the preamble symbols $p_{m,n}$ as defined according to this particular aspect of the second embodiment comprise especially the preamble symbols pertaining to the third and fourth examples of the first embodiment so much so that the simplified estimators proposed according to this particular aspect of the second embodiment make it possible, in addition to an estimation of a time shift followed by the estimation of a frequency shift, to estimate a phase shift.

In another embodiment, the invention pertains to a device for receiving an OQAM type multicarrier signal comprising means for estimating, in the time domain, at least one time, phase and/or frequency shift of the multicarrier signal. The means for estimating comprise at least one estimator for the estimation of the time shift, called a time estimator, and/or at least one estimator for estimating the phase shift, called a phase estimator, and/or at least one estimator for estimating the frequency shift, called a frequency estimator.

According to the invention, the multicarrier signal comprising at least one preamble, at least one of the estimators takes account of the efficiency of a prototype filter used at transmission to shape at least one preamble inserted in said multicarrier signal.

Such a device for receiving is especially suited to implementing the method for receiving described here above. It is for example a receiver implementing an OFDM/OQAM or BFDM/OQAM demodulator.

Such a receiver can of course comprise the different characteristics of the method for receiving according to the invention, which can be combined or taken in isolation. Thus, the characteristics and advantages of this receiver are the same as those of the method for receiving and are not described in more ample detail.

The invention also pertains to a computer program comprising instructions for implementing a method for receiving as described here above, when the program is executed by a processor.

Indeed, the method of the invention can be implemented in various ways, especially in wireline form or in software form.

5. LIST OF FIGURES

Other characteristics and advantages of the invention shall appear more clearly from the following description of a particular embodiment given by way of a simple, illustratory and non-exhaustive example and from the appended drawings, of which:

FIG. 1, described with reference to the prior art, presents a classic OFDM/OQAM modulation scheme;

FIGS. 2A and 2B respectively illustrate a general system of transmission implementing a technique of reception according to one embodiment of the invention, and the implemented estimation step;

Figure 14:
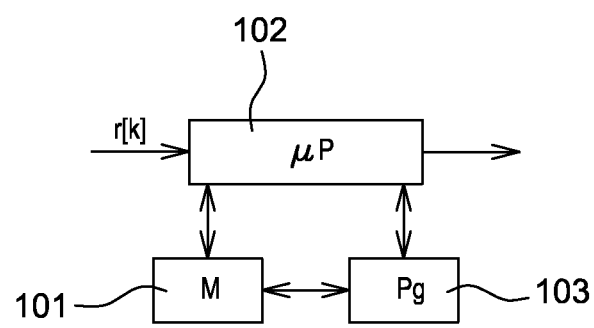

FIG. 14 presents the simplified structure of a receiver implementing a technique of reception according to one embodiment of the invention.

6. DESCRIPTION OF ONE EMBODIMENT OF THE INVENTION

6.1 General Principle

The invention is situated in the context of transmission systems implementing an OFDM/OQAM or BFDM/OQAM type modulation and implementing preambles, and proposes a technique for simplifying the operation of synchronization of the receivers.

It can be noted that, since these systems of transmission can be implemented in the form of banks of filters, they are also called FBMC/OQAM (Filter Bank Multicarrier/OQAM >>), or more generally OQAM systems.

The general principle of the invention relies on the use on the reception side of an estimator for at least one shift in time, phase and/or frequency of the multicarrier signal, each of these estimators taking account of the prototype filter used at transmission to shape the preamble. Such a prototype filter can be very short and, at transmission, can generate a preamble that is localized on a single OQAM multicarrier symbol.

In particular, if a multipath channel is considered, the estimators proposed according to the invention can be used to estimate the maximum delay introduced by the channel and therefore compensate accurately for the channel effects.

6.2 Example of Implementation

6.2.1 Transmission System

Figure 2A:
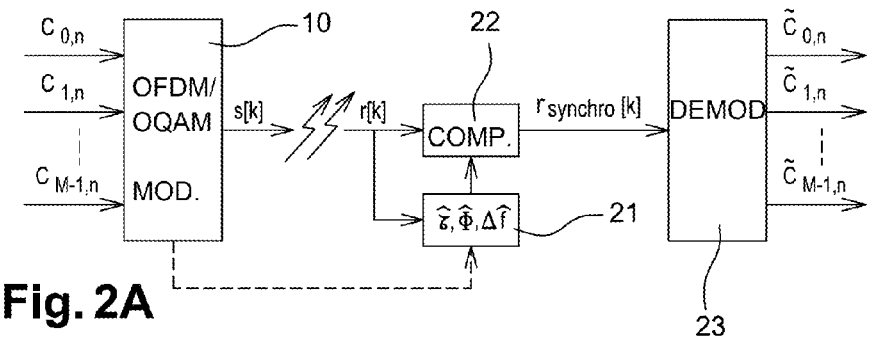

Referring to FIG. 2A, a general system of transmission implementing a technique of reception according to the invention is presented.

More specifically, the operations implemented on the sending side, namely the operations of pre-processing, conversion from the frequency domain to the time domain and filtering of the modulator 10, are known and have already been described with reference to FIG. 1.

It can be noted however, that in the case of a transmission system implementing a preamble, the incoming data symbols to be transmitted on a sub-carrier m at the instant n can be denoted as $c_{m,n}$ instead of $a_{m,n}$, and can be of complex values for the preamble symbols instead of being of real values for the payload data symbols. For example, the data symbols at the instants n=0 and n=1 are preamble symbols denoted as $p_{m,n}$, and the data symbols at the next instants are payload data symbols denoted as $a_{m,n}$.

The FBMC/OQAM multicarrier signal at output of the modulator 10 can therefore be expressed in the following form:

$$s[k] = \sum_{m=0}^{M-1} \sum_{n=-\infty}^{n=+\infty} c_{m,n} h\left(kT_s - n\frac{M}{2}T_s\right) e^{j\frac{2\pi}{M}m(k-D/2)T_s} e^{j\phi_{m,n}},$$

with $c_{m,n} = p_{m,n}$ symbols of complex value for the shaping of the preamble (preferably of real or imaginary pure value) and $c_{m,n} = a_{m,n}$ data symbols of real value for the shaping of the payload part, $T_s$ the sampling time chosen such that the symbol duration $T = MT_s$ with M=2N is the number of carriers. Again, it can be recalled that distinct prototype filters can be used to shape the preamble and the payload part of the multicarrier signal s[k].

The passage into the transmission channel can deform the multicarrier signal s[k], by introducing a Gaussian white additive noise, a time shift τ (also called a delay) and/or a phase shift ϕ, and/or a frequency shift Δf of the multicarrier signal.

The multicarrier signal received can therefore be expressed in the following form: $r[k] = s[k-\tau]e^{j\phi} + b[k]$ and/or $r(k) = e^{j2\pi\Delta f}[c(k) \otimes s(k-\tau)] + b(k)$ if the frequency shift occurs for example at transmission. It is also possible to take account of a frequency shift introduced at reception, with b[k] a centered circular complex additive white Gaussian noise with a spectral density $\sigma_b^2$, ⊗ representing a product of convolution and c(k) the response of a multipath channel.

On the reception side, it is sought to estimate these time shift parameters τ, a phase shift ϕ and a frequency shift Δf during an estimation step 21 and then to compensate for the multicarrier signal received during a compensation step 22 in order to synchronize the receiver.

At output of the compensation step 22, a synchronized signal is obtained that can be expressed in the following form:

$$r_{synchro}[k] = r[k+\hat{\tau}]e^{-j\hat{\phi}} \text{ and/or } r_{synchro}[k] = r[k+\hat{\tau}]e^{-j2\pi\alpha f}$$

This synchronized signal can then be demodulated conventionally during a demodulation step 23 in order to obtain an estimation of the sent data symbols $\tilde{c}_{m,n}$.

6.2.2 Estimation of the Time and Phase Shift According to the First Embodiment Here below, a more detailed description of the estimation step 21 is provided according to a first embodiment of the time shift parameters τ and phase shift parameters ϕ, especially represented by FIG. 2B.

The inventors of the present patent application, who are also inventors of the French patent application FR 1151590 filed on 28$^{th}$ Feb. 2011 on behalf of the same Applicant, have, in the above-mentioned patent application, shown particular relationships between the different outputs of the frequency/time transformation module 12 and polyphase filtering module 13 implemented at transmission.

More specifically, they have shown that the outputs of the frequency/time transformation modules are conjugate in sets of two, and that the polyphase components of the prototype filter are para-conjugate in sets of two.

It is therefore possible to use this symmetry to re-use a part of the results of the multiplications occurring at different instants of filtering, and thus reduce the complexity of the filtering.

It is also possible, according to the present invention, to use these relationships to reduce the complexity of the estimations implemented during the estimation step 21.

Thus, by choosing a delay such that D=qM−1, with q an integer, the inventors have shown that the following relationships are obtained at output of the frequency/time transformation module 12 whatever the incoming data symbols (payload data or preamble data):

$$\begin{cases} u_{k,n} = (-1)^n u^*_{M/2-k-1,n} & \text{for } 0 \le k \le M/4-1 \\ u_{M/2+k,n} = (-1)^n u^*_{M-k-1,n} & \text{for } 0 \le k \le M/4-1 \end{cases}$$

with:
$u_{m,n}$ a transformed signal associated with the output with index m of the frequency/time transformation step 12 at an instant n;
* the conjugate operator.

Consequently, if the instant n=0 is considered and whatever the type of preamble (random or deterministic), the following will be obtained for $0 \leq k \leq M/4-1$ and a prototype filter with a length $L=qM$, with q an integer such that $q \geq 1$:

$$h[M/2-1-k]s[k]=h[k]s^*[M/2-1-k]$$ and $$h[M-1-k]s[M/2+k]=h[M/2+k]s^*[M-1-k]$$

When there is no noise, i.e. considering $r[k]=s[k-\tau]e^{j\phi}$, these relationships can also be written as follows $$h[M/2-1-k]r[k+\tau]=h[k]r^*[M/2-1-k+\tau]e^{j2\phi} \quad (1)$$

$$h[M-1-k]r[M/2+k+\tau]=h[M/2+k]r^*[M-1-k+\tau]e^{j2\phi} \quad (2)$$

for $0 \leq k \leq M/4-1$.

It is possible to define two estimators, on the basis of a least square type of measurement between the outputs of the frequency/time transformation module 12 verifying a property of conjugation.

Figure 2B:
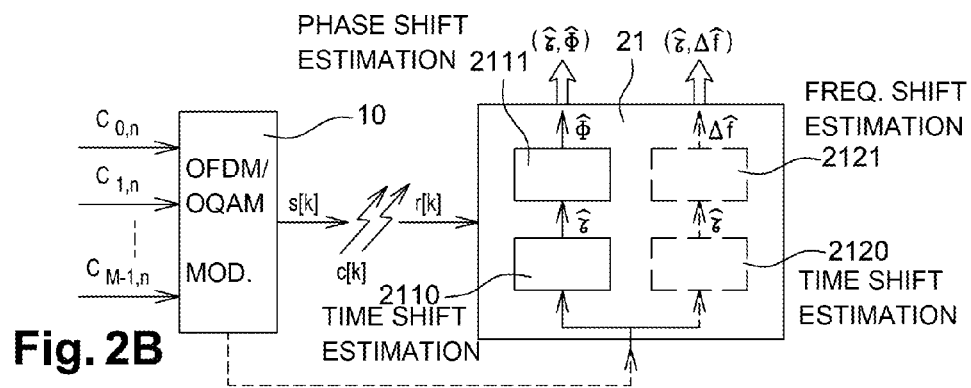

Thus, referring to FIG. 2B, according to this first embodiment, the estimation step (21) successively implements a first sub-step for estimating a time shift (2110) followed by a second sub-step for estimating (2111) of a phase shift.

The first estimator implementing the first sub-step for estimating a time shift (2110) is based on the relationship (1) and consists in minimizing the following cost function:

$$\psi_1(\hat{\tau}, \hat{\phi}) = \sum_{k=0}^{M/4-1} \left| h[M/2-1-k]r[k+\hat{\tau}] - h[k]r^*[M/2-1-k+\hat{\tau}]e^{j2\hat{\phi}} \right|^2$$

By developing this equation, it is obtained:

$$\psi_1(\hat{\tau}, \hat{\phi}) =$$

$$\sum_{k=0}^{M/4-1} h^2[M/2-1-k]|r[k+\hat{\tau}]|^2 + \sum_{k=0}^{M/4-1} h^2[k]|r[M/2-1-k+\hat{\tau}]|^2 -$$

$$2\mathrm{R}\left\{ e^{-2j\hat{\phi}} \sum_{k=0}^{M/4-1} h[k]h[M/2-1-k]r[k+\hat{\tau}]r[M/2-1-k+\hat{\tau}] \right\}$$

$$\psi_1(\hat{\tau}, \hat{\phi}) = \alpha(\hat{\tau}) - \beta(\hat{\tau}, \hat{\phi})$$

with:

$$\alpha(\hat{\tau}) = \sum_{k=0}^{M/2-1} h^2[M/2-1-k]|r[k+\hat{\tau}]|^2 \text{ and}$$

$$\beta(\hat{\tau}, \hat{\phi}) =$$

$$2\mathrm{R}\left\{ e^{-2j\hat{\phi}} \sum_{k=0}^{M/4-1} h[k]h[M/2-1-k]r[k+\hat{\tau}]r[M/2-1-k+\hat{\tau}] \right\}$$

It can be noted that the quantity $\alpha(\hat{\tau})$ is independent of the estimation of the phase shift $\hat{\phi}$ and weakly linked to the time shift $\hat{\tau}$. As a consequence, the first LS estimator amounts to jointly maximizing the function:

$$(\hat{\tau}_{LS}, \hat{\phi}_{LS}) = \underset{\hat{\tau}, \hat{\phi}}{\mathrm{argmax}} \beta(\hat{\tau}, \hat{\phi})$$

To obtain the estimation of the phase shift $\hat{\phi}_{LS}$ delivered by the second estimation sub-step (2111) of a phase shift, the estimation of the time shift $\hat{\tau}$ is fixed in the previous equation, and the estimation of the phase shift $\hat{\phi}$ is made to vary, thus leading to the following phase estimator:

$$\hat{\phi}_{LS_1} = \frac{1}{2} \angle \left\{ \sum_{k=0}^{M/4-1} h(k)h(M/2-1-k)r(k+\hat{\tau})r(M/2-1-k+\hat{\tau}) \right\}$$

where $\angle\{.\}$ designates the argument of a complex number.

Consequently, on the basis of the above equations, the following estimator for the time shift is obtained:

$$\hat{\tau}_{LS_1} = \underset{\hat{\tau}}{\mathrm{argmax}} \left| \sum_{k=0}^{M/4-1} h(k)h(M/2-1-k)r(k+\hat{\tau})r(M/2-1-k+\hat{\tau}) \right|. \quad (3)$$

It can be noted that, for this time estimator, the used preamble can be equal to an FBMC/OQAM multicarrier symbol (with the duration M/2) because the relationships on which this estimator is based (the relationships between the first M/2 samples) remain valid and are not affected by the following FBMC/OQAM multicarrier symbol, which is shifted by M/2 samples relative to the preamble. This observation can be applied even for a prototype filter length greater than M.

The second estimator is based on the relationship (2) and minimizes the following cost function:

$$\psi_2(\hat{\tau}, \hat{\phi}) =$$

$$\sum_{k=0}^{M/4-1} \left| h[M-1-k]r[M/2+k+\hat{\tau}] - h[M/2+k]r^*[M-1-k+\hat{\tau}]e^{j2\hat{\phi}} \right|^2$$

By following the same development as above, the following phase and time estimators are obtained:

$$\hat{\phi}_{LS_2} = \quad (4)$$

$$\frac{1}{2} \angle \left\{ \sum_{k=0}^{M/4-1} h(M-1-k)h(M/2+k)r(M/2+k+\hat{\tau})r(M-1-k+\hat{\tau}) \right\}$$

$$\hat{\tau}_{LS_2} = \underset{\hat{\tau}}{\mathrm{argmax}}$$

$$\left| \sum_{k=0}^{M/4-1} h(M-1-k)h(M/2+k)r(M/2+k+\hat{\tau})r(M-1-k+\hat{\tau}) \right|$$

It is noted that for this time estimator, the preamble preferably comprises a zero FBMC/OQAM multicarrier symbol before the payload data. The used preamble can therefore be equal to two FBMC/OQAM multicarrier symbols.

It is noted that the two phase estimators and the two time estimators proposed require prior knowledge on the prototype filter used at transmission but over a shorter range of correlation (M/2 samples instead of M). The complexity of computation of the estimators is therefore reduced by half.

6.2.3 Examples of Preambles and Time Estimators Simplified According to the First Embodiment In order to improve the estimation of the time synchronization performed prior to the phase synchronization, two types of preambles and the associated estimators are proposed here below, enabling a further reduction of the complexity of implementation of the synchronization.

Thus, a simplification of the computations can be obtained for the estimators proposed here above and for specific preambles, leading to better performing estimators. This simplification is due to the presence of peak values at the output of the frequency/time transformation module, also called maximum values, for the preamble. The position of these peak values depends on the used preamble. The performance of the estimators is related to the position of this peak values relative to the coefficients of the prototype filter used at transmission. An optimum choice of the position of these peak values is made in such a way that they are filtered by fairly big filter coefficients.

To this end, different examples of preambles are proposed, enabling at least one of the following criteria to be fulfilled:

the quantity of data contained in the preamble and therefore the length of the preamble must be reduced to the utmost in order to increase the spectral efficiency;

the possibility of obtaining high performance, i.e. the capacity to make a precise estimation of the delay $\hat{\tau}$ which depends exactly on the design of the estimator;

the possibility of being used for other functions, such as estimation of the transmission channel.

In the examples here below, on the basis of these criteria, the inventors have proposed two main types of preamble, with several variants for each type, and the corresponding estimators. The choices of preambles and estimators are evaluated in considering a prototype filter optimized for a time-frequency localization with a length L=M, denoted as TFL.

However, the invention is not limited to the use of such a prototype filter and the principle proposed can be applied equivalently to prototype filters having an arbitrary length, especially a multiple of M, with M as an even-parity value.

A) First Type of Preamble

First of all, two novel preambles are presented, which are particularly promising because they can be used for other functions, such as channel estimation.

According to a first example, a preamble emitted at the instant n and having the following structure is considered:

$$\begin{cases} p_{m,n} = \sqrt{2}/2 \text{ for } m = 4p \text{ and } m = 1 + 4p \\ p_{m,n} = -\sqrt{2}/2 \text{ for } m = 2 + 4p \text{ and } m = 3 + 4p \end{cases}$$

with $p_{m,n}$ a preamble symbol associated with a sub-carrier having an index m at the instant n, p an integer, and $0 \leq m \leq M-1$.

According to a second example, a preamble sent at the instant n having the following structure is considered:

$$\begin{cases} p_{2m,n} = \sqrt{2}/2 \\ p_{2m+1,n} = j\sqrt{2}/2 \end{cases}$$

for $0 \leq m \leq M/2 - 1$.

In particular, it may be recalled that it can be necessary to add one or more columns of zero preamble symbols before the payload part, such as $p_{m,n+i}=0$ for i=1, 2, . . . .

The addition of such a column of zero preamble symbols makes it possible to separate the first OQAM multicarrier symbol of the preamble (corresponding to n=0) from the payload part of the multicarrier signal in order to preserve the properties of conjugation.

By using the time estimator $\hat{\tau}_{LS_1}$ defined in the equation (3) the preamble can be formed by a single column of preamble symbols (for n=0 for example), since the relationships of conjugation obtained between the first M/2 samples of the multicarrier signal are valid even if the next column (for n=1 for example) belongs to the payload part of the multicarrier signal.

By contrast, if the time estimator $\hat{\tau}_{LS_2}$ defined in equation (4) is used, the preamble must be formed by at least two columns of preamble symbols, of which a first one is defined by the previous equations with $p_{2m,n}=\sqrt{2}/2$ and $p_{2m+1,n}=j\sqrt{2}/2$, and at least a second one is defined by $p_{m,n+1}=0$.

A preamble according to the second example makes it possible to obtain peak values at the outputs with indices M/4−1 and M/4 of the frequency/time transformation step rather than at the outputs with indices 0 and M/2−1 in the first example. This is worthwhile because, if a preamble according to the first example is considered, after filtering by the coefficient h[0] of the prototype filter, the peak value of the output with index 0 will be attenuated, and therefore the multiplication of the two peak values at the outputs with indices 0 and M/2−1 in the equation of the time estimator $\hat{\tau}_{LS_1}$ defined in the equation (3) will be disturbed by the noise and the multipath channel. It is therefore desirable to propose this second example of preamble, which enables the position of the peak values to be shifted.

The preambles according to these two first examples therefore have pairs of peak values at output of the step of frequency/time transformation, at transmission, at different positions.

Thus, the preamble according to the first example has maximum values at the outputs of the frequency/time transformation module 12 with indices 0, M/2−1, M/2 and M−1. The preamble according to the second example has maximum values at the outputs of the frequency time/transformation module 12 with indices M/4−1, M/4, 3M/4−1 and 3M/4.

Using the fact that pairs of peak values can be generated by the FBMC/OQAM modulator at particular positions in choosing an appropriate preamble and in taking account of the intrinsic properties of symmetry/conjugation intrinsic to the modulator, it is possible to further simplify the operation of estimation of the phase and time shifts of the multicarrier signal in reducing the complexity of the computations associated with the estimators.

More specifically, it can be deduced that the peak values of the signal received contribute preponderantly to the computation of the delay in using the previous estimators defined in the equations (3) and (4). These peak values are the least affected in the presence of noise or of a multipath channel. It is therefore possible to make these estimators more robust and less complex by overlooking the computation of the products of the samples that do not correspond to peak values. Simplified or reduced LS estimators are then obtained.

Therefore, having prior knowledge of the peak values of the signal sent, it is possible, for each preamble, to obtain the reduced LS estimators corresponding to the previous estimators.

Thus, the preamble according to the first example is considered, the first reduced estimator corresponding to the estimator $\hat{\tau}_{LS_1}$ defined in the equation (3) can be expressed in the following form:

$$\hat{\tau}_{LS_1} = \underset{\hat{\tau}}{\operatorname{argmax}}|r(\hat{\tau})r(M/2-1+\hat{\tau})|,$$

since the first pair of peak values is obtained at the outputs with indices 0 and M/2−1,
and the second reduced estimator corresponding to the estimator $\hat{\tau}_{LS_2}$ defined in the equation (4) can be expressed in the following form:

$$\hat{\tau}_{LS_2} = \underset{\hat{\tau}}{\operatorname{argmax}}|r(M/2+\hat{\tau})r(M-1+\hat{\tau})|,$$

since the second pair of peak values is obtained at the outputs having indices M/2 and M−1.

If the preamble according to the second example is considered, the first reduced estimator corresponding to the estimator $\hat{\tau}_{LS_1}$ defined in the equation (3) can be expressed in the following form:

$$\hat{\tau}_{LS_1} = \underset{\hat{\tau}}{\operatorname{argmax}}|r(M/4-1+\hat{\tau})r(M/4+\hat{\tau})|,$$

since the first pair of peak values is obtained at the outputs having indices M/4−1 and M/4;
and the second reduced estimator corresponding to the estimator $\hat{\tau}_{LS_2}$ defined in the equation (4) can be expressed in the following form:

$$\hat{\tau}_{LS_2} = \underset{\hat{\tau}}{\operatorname{argmax}}|r(3M/4-1+\hat{\tau})r(3M/4+\hat{\tau})|,$$

since the second pair of peak values is obtained at the outputs having indices 3M/4−1 and 3M/4.

B) Second Type of Preamble

Here below, three other examples of preambles formed by a column of preamble symbols are presented, wherein half the carriers have a zero value and possibly one or more columns of preamble symbols, of which all the carriers have a zero value, called a zero symbols.

Such preambles are particularly valuable in that they can be used to obtain an additional property of conjugation.

Thus, if an FBMC/OQAM transmission system implementing a number M of carriers that is a multiple of 4 and a time lag D=qM−1 (with D=L−1 in the orthogonal case and D≤L−1 in the bi-orthogonal case) is taken, and if the reasoning described in the French patent application FR 1151590 mentioned here above is followed, it can be shown that the outputs of the frequency/time transformation step applied to the symbols of the preamble are related as follows:

$$\begin{cases} u_{k,n} = (-1)^n u^*_{M/2-k-1,n} & \text{for } 0 \le k \le M/4-1 \\ u_{M/2+k,n} = (-1)^n u^*_{M-k-1,n} & \text{for } 0 \le k \le M/4-1 \\ u_{k,n} = (-1)^n u^*_{M-k-1,n} & \text{for } 0 \le k \le M/2-1 \end{cases}$$

with:
$u_{m,n}$ a transformed symbol associated with the output with index m of the frequency/time transformation step 12 at an instant n;
* the conjugate operator.

It is considered for example that the first column of preamble symbols is sent at an even-parity instant n.

Taking account of this novel property of conjugation, a novel estimator can be defined. Indeed, for 0≤k≤M/4−1 the following relationship is obtained if the prototype filter is symmetrical and has a length L=M:

$s[k]=s^*[M-1-k]$ for 0≤k≤M/2−1.

It can be noted that if a prototype filter with a length L=qM is considered, it is desirable to add 2q−1 columns of zero preamble symbols at the end of the preamble to separate the preamble (after modulation) from the payload data. The above relationship therefore remains valid for 0≤k≤qM/2−1.

When there is no noise, the above relationship leads to the following expression of the received signal:

$r[k+\tau]=r^*[M-1-k+\tau]e^{j2\phi}$ for 0≤k≤M/2−1:

From this relationship, it is possible to define a novel estimator that does not require the zero-setting of the first coefficient of the prototype filter. Indeed, the cost function to be minimized is given by:

$$\psi_3(\hat{\tau}, \hat{\phi}) = \sum_{k=0}^{M/2-1} \left| r[k+\hat{\tau}] - r^*[M-1-k+\hat{\tau}]e^{j2\hat{\phi}} \right|^2$$

which leads to the following phase estimator and time estimator:

$$\hat{\phi}_{LS_3} = \frac{1}{2} \angle \left\{ \sum_{k=0}^{M/2-1} r(k+\hat{\tau})r(M-1-k+\hat{\tau}) \right\} \quad (5)$$

and $$\hat{\tau}_{LS_3} = \underset{\hat{\tau}}{\operatorname{argmax}} \left| \sum_{k=0}^{M/2-1} r(k+\hat{\tau})r(M-1-k+\hat{\tau}) \right|.$$

Such estimators especially have high performance if they are combined with the use of one of the following preambles.

Thus, according to a third example, a preamble sent at the instant n having the following structure is considered:

$$\begin{cases} p_{2m,n} = \sqrt{2}/2 \\ p_{2m+1,n} = 0 \end{cases} \text{for } 0 \le m \le M/2-1$$

with $p_{m,n}$ a preamble symbol associated with a sub-carrier having an index m at the instant n.

According to a fourth example, a preamble sent at the instant n having the following structure is considered:

$$\begin{cases} p_{2m,n} = (-1)^m \sqrt{2}/2 \\ p_{2m+1,n} = 0 \end{cases} \text{for } 0 \le m \le M/2-1.$$

The preambles according to the third and fourth examples make it possible to obtain pairs of peak values at output of the frequency/time transformation step at different positions.

Thus, the preamble according to the third example makes it possible to obtain maximum values at the outputs of the frequency/time transformation module 12 with indices M/4−1, M/4, 3M/4−1 and 3M/4. The preamble according to the fourth example makes it possible to obtain maximum values at the outputs of the frequency/time transformation module 12 having indices 0, M/2−1, M/2 and M−1. As already indicated, the position and the number of these peaks can have an impact on the complexity and the performance of the estimator.

Here below, a fifth example of a preamble is proposed, permitting to limit the maximum value of the pairs of peaks obtained at output of the frequency/time performance operation, in order to limit the PAPR (peak to average power ratio) of the multicarrier signal sent.

The preamble according to this fifth example at the instant n has for example the following structure:

$$\begin{cases} p_{m,n} = 1 & \text{if mod } (m, 4) = 0 \\ p_{m,n} = 0 & \text{else} \end{cases} \quad 0 \le m \le M-1.$$

Figure 3:
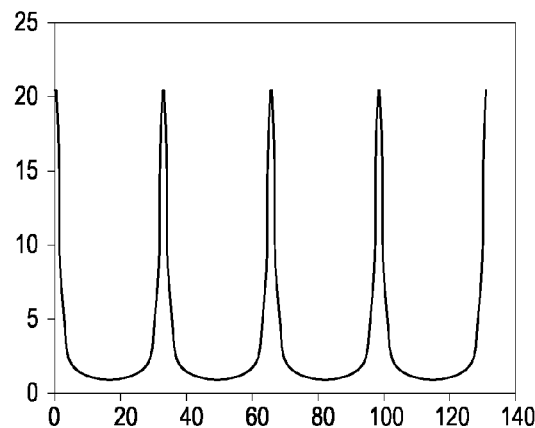
FIG. 3 represents the amplitude of the outputs of the frequency/time transformation module for a given preamble.

In this case, the maximum values are obtained at the outputs with indices 0, M/4−1, M/4, M/2−1, M/2 and M−1, as illustrated in FIG. 3 for a number of carriers M=128, where the X axis represents the indices of the outputs of the frequency/time transformation module, and the Y axis represents the amplitude of the preamble at output of the frequency/time transformation module.

Such a preamble thus makes it possible to distribute the maximum values on a greater number of outputs of the frequency/time transformation module, with lower amplitudes and therefore to reduce the PAPR of the sent signal.

As already indicated with reference to the first two examples of preambles, it can be necessary, in these three last examples, to add one or more columns of zero preamble symbols in the preamble after modulation, before the payload part, in order to preserve the properties of conjugation after filtering.

Thus, if we use the time estimator $\hat{\tau}_{LS_2}$ defined in the equation (4) or the time estimator $\hat{\tau}_{LS_3}$ defined in the equation (5) the preamble must be formed by at least two columns of preamble symbols, a first one defined by the preceding equations, and at least a second one defined by $p_{m,n+1}=0$ for $0 \le m \le M-1$. More specifically, to use a prototype filter with a length L=qM, it is desirable to insert 2q−1 columns of zero-preamble symbols into the preamble to separate the first column of preamble symbols defined by the preceding equations and the payload data.

By contrast, to use the time estimator $\hat{\tau}_{LS_1}$ as defined in the equation (3), it can happen that the preamble is formed by only one column of preamble symbols (for n=0 for example).

As described here above with reference to the first two examples of preambles, it is also possible to reduce/simplify the estimators proposed and increase their performance in taking account of the position of the pairs of peak values generated by the FBMC/OQAM modulator.

Thus, if we consider the preamble according to the third example, the first reduced estimator corresponding to the estimator $\hat{\tau}_{LS_1}$ defined in the equation (3) can be expressed in the following form:

$$\hat{\tau}_{LS_1} = \underset{\tilde{\tau}}{\arg\max} |r(M/4-1+\tilde{\tau})r(M/4+\tilde{\tau})|,$$

since the first pair of peak values is obtained at the outputs with indices M/4−1 and M/4, the second reduced estimator corresponding to the estimator $\hat{\tau}_{LS_2}$ defined in the equation (4) can be expressed in the following form:

$$\hat{\tau}_{LS_2} = \underset{\tilde{\tau}}{\arg\max} |r(3M/4-1+\tilde{\tau})r(3M/4+\tilde{\tau})|,$$

since the second pair of peak values is obtained at the outputs with indices 3M/4−1 and 3M/4, and the third reduced estimator corresponding to the estimator $\hat{\tau}_{LS_3}$ defined in the equation (5) can be expressed in the following form:

$$\hat{\tau}_{LS_3} = \underset{\tilde{\tau}}{\arg\max} |r(M/4-1+\tilde{\tau})r(3M/4+\tilde{\tau}) + r(M/4+\tilde{\tau})r(3M/4-1+\tilde{\tau})|,$$

since the two pairs of peaks are obtained at the outputs with indices M/4−1, M/4, 3M/4−1 and 3M/4.

If we consider the preamble according to the fourth example, the first reduced estimator corresponding to the estimator $\hat{\tau}_{LS_1}$ defined in the equation (3) can be expressed in the following form:

$$\hat{\tau}_{LS_1} = \underset{\tilde{\tau}}{\arg\max} |r(\tilde{\tau})r(M/2-1+\tilde{\tau})|,$$

since the first pair of peak values is obtained at the outputs with indices 0 and M/2−1;

the second reduced estimator corresponding to the estimator $\hat{\tau}_{LS_2}$ defined in the equation (4) can be expressed in the following form:

$$\hat{\tau}_{LS_2} = \underset{\tilde{\tau}}{\arg\max} |r(M/2+\tilde{\tau})r(M-1+\tilde{\tau})|,$$

since the second pair of peak values is obtained at the outputs with indices M/2 and M−1, and the third reduced estimator corresponding to the estimator $\hat{\tau}_{LS_3}$ defined in the equation (5) can be expressed in the following form:

$$\hat{\tau}_{LS_3} = \underset{\tilde{\tau}}{\arg\max} |r(\tilde{\tau})r(M-1+\tilde{\tau}) + r(M/2-1+\tilde{\tau})r(M/2+\tilde{\tau})|,$$

since the two pairs of peaks are obtained at the outputs with indices 0, M/2−1, M/2 and M−1.

If we consider the preamble according to the fifth example, the first reduced estimator corresponding to the estimator $\hat{\tau}_{LS_1}$ defined in the equation (3) can be expressed in the following form:

$$\hat{\tau}_{LS_1} = \underset{\hat{\tau}}{\operatorname{argmax}}\ |r(\hat{\tau})r(M/2-1+\hat{\tau}) + r(M/4-1+\hat{\tau})r(M/4+\hat{\tau})|$$

since the peak values are obtained at the outputs with indices 0, M/2−1, M/4−1 and M/4;
the second reduced estimator corresponding to the estimator $\hat{\tau}_{LS_2}$ defined in the equation (4) can be expressed in the following form:

$$\hat{\tau}_{LS_2} = \underset{\hat{\tau}}{\operatorname{argmax}}\ |r(M/2+\hat{\tau})r(M-1+\hat{\tau}) + r(3M/4-1+\hat{\tau})r(3M/4+\hat{\tau})|$$

since the peak values are obtained at the outputs with indices M/2, M−1, 3M/4−1, 3M/4,
and the third reduced estimator corresponding to the estimator $\hat{\tau}_{LS_3}$ defined in the equation (5) can be expressed in the following form:

$$\hat{\tau}_{LS_3} = \underset{\hat{\tau}}{\operatorname{argmax}}\ |r(\hat{\tau})r(M-1+\hat{\tau}) + r(M/4-1+\hat{\tau})r(3M/4+\hat{\tau}) +$$
$$r(M/4+\hat{\tau})r(3M/4-1+\hat{\tau}) + r(M/2-1+\hat{\tau})r(M/2+\hat{\tau})|$$

It is seen therefore that the simplified/reduced estimators proposed according to the invention perform well as compared with the non-simplified estimators.

Indeed, when there is noise and a multipath channel, the samples of the multicarrier signals with low amplitudes will be disturbed and therefore reduce the performance of the estimator. It is therefore proposed, in at least one embodiment of the invention, to eliminate these samples and to keep only the peak values of the multicarrier signal which for their part are less affected by the noise and the channel.

This leads to obtaining reduced estimators which have better performance than the non-simplified estimators as defined in the equations (3), (4) and (5) because these simplified estimators reduce the number of peak values around the value to be estimated.

6.2.4 Estimation of Time and Frequency Shifts According to the Second Embodiment Here below, a more detailed description is given of the step 21 of estimation, according to a second embodiment, of the time shift parameter τ and frequency shift parameter Δf especially represented in FIG. 2B.

Just as in the case of the first embodiment, on the basis of the French patent application FR 1151590 filed on 28$^{th}$ Feb. 2011 on behalf of the present Applicant, the second embodiment of the invention delivering a time and frequency estimation derives profit from the particular relationships between the different outputs of the frequency/time transformation module 12 and polyphase filtering module 13 implemented at transmission, in relying on the demonstration of the inventors who have shown that the outputs of the frequency/time transformation module are conjugate in sets of two and the polyphase components of the prototype filter are para-conjugate in sets of two.

It is therefore possible to use this symmetry to reutilize a part of the results of the multiplications that take place at different filtering times and thus to reduce the complexity of the filtering.

It is also possible according to the present invention to use these relationships to reduce the complexity of the time and frequency estimators implemented during the successive sub-steps of timing estimation (2120) and frequency estimation (2121) of the estimation step 21 according to a second embodiment.

Thus, in choosing a time lag such that D=qM−1, with q an integer and for a particular preamble formed by two FBMC/OQAM symbols, for which half of the carriers (even-parity and odd-parity) are zero, such that:
the first symbol sent at the instant n=0 such that:

$$\begin{cases} p_{2m,0} = d \text{ with } d \in \mathfrak{R} \text{ or } d \in \mathcal{J} \\ p_{2m+1,0} = 0 \end{cases}$$

or $$\begin{cases} p_{2m,0} = 0 \\ p_{2m+1,0} = d \text{ with } d \in \mathfrak{R} \text{ or } d \in \mathcal{J} \end{cases}$$

with $p_{m,n}$ a preamble symbol associated with a sub-carrier with an index m at the instant n=0, and 0≤m≤M/2−1, with M the number of sub-carriers of an OQAM symbol of said multicarrier signal, the value of d, which is a pure real value or a pure imaginary value being capable of being adjusted as a function of a compromise between the performance of the estimator and the PAPR (peak to average power ratio) value of the multicarrier signal sent;
while the following symbol sent at the instant n=1 corresponds to a zero symbol such that:

$p_{m,1}=0$, for 0≤m≤M−1 the inventors have shown that the following relationships are obtained at output of the frequency/time transformation module for this choice of preamble:

$u_{k,n}=(-1)^n u_{M/2+k,n}$ for 0≤k≤M/2−1 with:
$u_{m,n}$ a transform symbol associated with the output with index m of the frequency/time transformation step 12 at an instant n.

Consequently, if we re-write the relationship representing the FBMC/OQAM multicarrier signal at output of the modulator expressed in the following form:

$$s[k] = \sum_{m=0}^{M-1} \sum_{n=-\infty}^{n=+\infty} c_{m,n} h\left(kT_s - n\frac{M}{2}T_s\right) e^{j\frac{2\pi}{M}m(k-D/2)T_s} e^{j\phi_{m,n}}$$

with $c_{m,n}=p_{m,n}$ data symbols of complex value for the shaping of the preamble (preferably with pure real or imaginary value), and $c_{m,n}=a_{m,n}$ data symbols of real value for the shaping of the payload part, $T_s$ the sampling time chosen such that the symbol duration $T=MT_s$ with M=2N the number of carriers. Again, it may be recalled that distinct prototype filters can be used to shape the preamble and the payload part of the multicarrier signal s[k], in being restricted to M−1 first samples and for 0≤k≤M/2−1 a modulated preamble signal is obtained, given by the following relationship:

$$s_p[k] = \sum_{m=0}^{M-1} p_{m,0} h[k] e^{j\frac{2\pi}{M}m(k-D/2)} e^{j\phi_{m,0}} = h[k] \underbrace{\sum_{m=0}^{M-1} p_{m,0} e^{j\frac{2\pi}{M}m(k-D/2)} e^{j\phi_{m,0}}}_{u_{k,0}}$$

Given the previous relationship between each transformed symbol $u_{m,n}$ for the particular preambles used for the estimation of the time shift and the frequency shift according to the second embodiment of the invention, the preamble signal appropriately weighted by multiplying with the coefficients of the prototype filter, for example at the instant k by the coefficient h[M/2+k], and at the instant M/2+k by h[k], presents a "pseudo-periodicity" expressed for 0≤k≤M/2−1 by the relationship:

$$h[M/2+k]s_p[k]=h[k]s_p[M/2+k] \quad (6)$$

When there is no noise and for a flat channel (c(k)=1), i.e. if we consider $r[k]=e^{j2\pi\Delta f}s[k-\tau]$, minimizing the two terms of the relationship (6) amounts to minimizing the following quantity:

$$(\Delta \hat{f}, \hat{\tau}) = \underset{\Delta \tilde{f}, \tilde{\tau}}{\operatorname{argmin}} \left\{ \sum_{k=0}^{M/2-1} \left| h[k+M/2]r[k+\tilde{\tau}] - h[k]r[k+\tilde{\tau}+M/2]e^{-j2\pi\Delta \tilde{f}\frac{M}{2}} \right|^2 \right\} \quad (7)$$

It is possible to define two estimators on the basis of a "least squares" (LS) type measurement between the outputs of the frequency/time transformation module 12 verifying a property of conjugation.

Thus, with respect to FIG. 2B, according to this first embodiment, the estimation step (21) successively implements a first sub-step for estimating a time shift (2120) followed by a second sub-step for estimating (2121) of a frequency shift.

The first estimator implementing the first sub-step for estimating a time shift (2120) is based on the minimizing of the relationship (7) and consists in minimizing the following cost function in writing $A=h[k+M/2]r[k+\tilde{\tau}]$, $B=h[k]r[k+\tilde{\tau}+M/2]$ and $$\alpha = 2\pi\Delta\tilde{f}\frac{M}{2}$$

and in recalling that $|A-B|^2=(A-B)(A^*-B^*)$:

$$(\Delta \hat{f}, \hat{\tau}) = \underset{\Delta \tilde{f}, \tilde{\tau}}{\operatorname{argmin}} \left\{ \sum_{k=0}^{M/2-1} \{(A-B)(A^* - B^*e^{-j\alpha})\} \right\}$$

$$= \underset{\Delta \tilde{f}, \tilde{\tau}}{\operatorname{argmin}} \left\{ \sum_{k=0}^{M/2-1} \{|A|^2 + |B|^2 - 2\Re\{AB^*e^{-j\alpha}\}\} \right\}$$

$$= \underset{\Delta \tilde{f}, \tilde{\tau}}{\operatorname{argmin}} \left\{ \sum_{k=0}^{M/2-1} \{|A|^2 + |B|^2\} - \left| 2\sum_{k=0}^{M/2-1} AB^* \right| \cos\left(-\alpha + \angle \sum_{k=0}^{M/2-1} AB^*\right) \right\}$$

We obtain a minimum relative to the frequency shift $\Delta\tilde{f}$ when the cosine is equal to 1, i.e. $\alpha = \angle AB^*$ from these developments, we then obtain the time estimator implementing the first sub-step for estimating a time shift according to the following relationship:

$$\hat{\tau}_{LS} = \underset{\tilde{\tau}}{\operatorname{argmax}} \ [2|R_1(\tilde{\tau})| - Q_1(\tilde{\tau})],$$

and the frequency estimation implementing the second sub-step for estimating a frequency shift according to the following equation:

$$\Delta \hat{f}_{LS} = \frac{1}{2\pi N} \arg\{R_1(\hat{\tau}_{LS})\},$$

with:

N a discrete time shift, $$R_1(\tilde{\tau}) = \sum_{k=0}^{M/2-1} h(k)h(k+M/2)r^*(k+\tilde{\tau})r(k+M/2+\tilde{\tau}),$$

$$Q_1(\tilde{\tau}) = \sum_{k=0}^{M/2-1} h(k)^2|r(k+\tilde{\tau})|^2 + h(k+M/2)^2|r(k+M/2+\tilde{\tau})|^2,$$

$\hat{\tau}_{LS}$ the estimation of the time shift at output of said time estimator;
$\Delta \hat{f}_{LS}$ the estimation of the frequency shift at output of said phase estimator;
M the number of sub-carriers of an OQAM symbol of said multicarrier signal;
k an integer such that 0≤k≤M/2−1;
$\tilde{\tau}$ an integer such that $0 \leq \tilde{\tau} \leq \tilde{\tau}_{max}$ with $\tilde{\tau}_{max}$ is a maximum predetermined value of $\tilde{\tau}$
h(k) coefficients of said prototype filter used at transmission;
r(k) is a received multicarrier signal such that $r(k)=e^{j2\pi\Delta f}[c(k) \otimes s(k-\tau)]+b(k)$ if the frequency shift occurs for example at transmission. It is also possible to take account of the frequency shift introduced at reception;
⊗ a convolution product;
c(k) a response of a multipath channel;
s(k) a sent multicarrier signal;
b(k) a Gaussian white noise;
τ the time shift of the multicarrier signal relative to the multicarrier signal sent;
Δf the frequency shift of the received multicarrier signal relative to the sent multicarrier signal.

6.2.5 Examples of Preambles and Time and Frequency Estimators Amplified According to the Second Embodiment In order to improve the estimation of the time synchronization performed preliminarily to the synchronization in frequency, a reduction is proposed here below of the complexity of the computations that can be done for the estimators proposed here above and for specific preambles, leading to better performing estimators.

This simplification is due to the presence of peak values at the output of the frequency/time transformation module, also called peak values or maximum values for the preamble. The position of these peak values depends on the preamble used. The performance of the estimators is related to the position of these peak values relative to the coefficients of the prototype filter used at transmission. An optimal choice of the position of these peak values is done in such a way that they are filtered by fairly large coefficients of the filter.

Thus, using the particular preamble proposed here above for the time and frequency synchronization formed by two FBMC/OQAM symbols, of which half of the carriers (even-parity and odd-parity) are zero values such that:
the first symbol sent at the instant n=0 such that:

$$\begin{cases} p_{2m,0} = d \text{ with } d \in \mathcal{R} \text{ or } d \in \mathcal{J} \\ p_{2m+1,0} = 0 \end{cases}$$

-continued or $$\begin{cases} p_{2m,0} = 0 \\ p_{2m+1,0} = d \text{ with } d \in \mathcal{R} \text{ or } d \in \mathcal{J} \end{cases} \quad (5)$$

with $p_{m,n}$ a preamble symbol associated with a sub-carrier with index m at the instant n=0, and $0 \leq m \leq M/2-1$, with M the number of sub-carriers of an OQAM symbol of said multicarrier signal, the value d being capable of being adjusted as a function of a compromise between the performance of the estimator and the PAPR (peak to average power ratio) value of the multicarrier signal sent;
while the following symbol sent at the instant n=1 corresponds to a zero symbol such that:

$$p_{m,1} = 0, \text{ for } 0 \leq m \leq M-1,$$

and in being limited solely to the high-amplitude outputs of the frequency/time transformation module namely in being limited to peak values, it is possible to obtain amplified time and frequency estimators.

In other words, this example of an "even-parity" preamble will necessarily have the form $p_{2m+1}=0$ and $p_{2m}=\pm d$, with d as a pure real or imaginary value, the sign of d depending on the value of m.

Indeed, again on the basis of the minimization of the relationship (7), in assuming $A=h[k+M/2]r[k+\tilde{\tau}]$, $B=h[k]r[k+\tilde{\tau}+M/2]$ and $$\alpha = 2\pi \Delta \tilde{f} \frac{M}{2}$$

and in recalling that $|A-Be^{-j\alpha}|^2 = (A-Be^{-j\alpha})(A^*-B^*e^{j\alpha})$ the following cost function is minimized:

$$\begin{aligned}(\Delta \hat{f}, \hat{\tau}) &= \underset{\Delta \tilde{f}, \tilde{\tau}}{\operatorname{argmin}} \left\{ \sum_{k=0}^{M/2-1} \{(A-Be^{-j\alpha})(A^*-B^*e^{-j\alpha})\} \right\} \\ &= \underset{\Delta \tilde{f}, \tilde{\tau}}{\operatorname{argmin}} \left\{ \sum_{k=0}^{M/2-1} \{|A|^2+|B|^2 - 2\Re\{AB^*e^{-j\alpha}\}\} \right\} \\ &= \underset{\Delta \tilde{f}, \tilde{\tau}}{\operatorname{argmin}} \left\{ \sum_{k=0}^{M/2-1} \{|A|^2+|B|^2\} - \right. \\ &\quad \left. \left| 2\sum_{k=0}^{M/2-1} AB^* \right| \cos\left(-\alpha + \angle \sum_{k=0}^{M/2-1} AB^*\right) \right\} \end{aligned} \quad (8)$$

The expressions of A and B depend only on $\tau$, using the particular preamble proposed here above for the time and frequency synchronization, and in being limited only to the high-amplitude outputs of the high-amplitude frequency/time transformation module, i.e. in being limited to the peak values, for example for the positions of the following maximum values k, M/2−1−k, M/2+k, M−1−k, with k an integer, we obtain a minimum of the equation (8) relative to the frequency shift $\Delta \tilde{f}$ when the cosine is equal to 1, i.e. $\tilde{\alpha}(\tilde{\tau}) = \angle R(\tilde{\tau})$, with:

$$R(\tilde{\tau}) = h(k)h(k+M/2)r^*(k+\tilde{\tau})r(k+M/2+\tilde{\tau}) + h(M/2-1-k)h(M-1-k)r^*(M/2-1-k+\tilde{\tau})r(M-1-k+\tilde{\tau})$$

Because the cosine is equal to 1, we then obtain the following time estimate:

On the basis of these developments, we then obtain the time estimator implementing the first sub-step for estimating a time shift according to the following equation:

$$\hat{\tau}_{LS} = \underset{\tilde{\tau}}{\operatorname{argmax}} \{2|R_1(\tilde{\tau})| - Q_1(\tilde{\tau})\} \quad (9)$$

where $$Q(\tilde{\tau}) = h(k+M/2)^2|r(k+\tilde{\tau})|^2 h(M-1-k)^2|r(M/2-1-k+\tilde{\tau})|^2 + h(k)|r(M/2+k+\tilde{\tau})|^2 h(M/2-1-k)^2|r(M-1-k+\tilde{\tau})|^2$$

Once the time shift has been estimated, it is possible to estimate the frequency shift:

$$\tilde{\alpha}(\tilde{\tau}) = \angle R(\tilde{\tau})$$

In addition, since $|R(\tilde{\tau})|$ and $Q(\tilde{\tau})$ have peak values for $\tilde{\tau} = \tilde{\tau}$ it is possible to replace the difference of the equation (9) by the product according to the following equation:

$$\hat{\tau}_{LS} = \underset{\tilde{\tau}}{\operatorname{argmax}} \{|R_1(\tilde{\tau})|Q_1(\tilde{\tau})\}, \quad (10)$$

thus reducing the complexity of the time estimation sub-step.

Consequently, we obtain the simplified frequency estimator implementing the second sub-step for estimating a frequency shift according to the following equation:

$$\Delta \hat{f}_{LS} = \frac{1}{2\pi N} \arg \{R_1(\hat{\tau}_{LS})\},$$

with M the number of sub-carriers of an OQAM symbol of said multicarrier signal:
$\hat{\tau}_{LS}$ the estimation of said time shift at output of said time estimator;
$\Delta \hat{f}_{LS}$ the estimation of said frequency shift at output of said phase estimator;
M the number of sub-carriers of an OQAM symbol of said multicarrier signal;
$\tilde{\tau}$ an integer such that $0 \leq \tilde{\tau} \leq \tilde{\tau}_{max}$ with $\tilde{\tau}_{max}$ is a predetermined maximum value of $\tilde{\tau}$
h(k) the coefficients of said prototype filter used at transmission;
r(k) a received multicarrier signal such that $r(k) = e^{j2\pi\Delta f}[c(k) \otimes s(k-\tau)] + b(k)$;
$\otimes$ a convolution product;
c(k) the response of a multipath channel;
s(k) a sent multicarrier signal;
b(k) a Gaussian white noise;
$\tau$ the time shift of the received multicarrier signal relative to said sent multicarrier signal;
$\Delta f$ the frequency shift of the received multicarrier signal relative to said sent multicarrier signal.

Thus, for a value of k equal to M/4−1 we obtain the following expressions of $R(\tilde{\tau})$ and $Q(\tilde{\tau})$:

$$R(\tilde{\tau}) = h(M/4-1)h(3M/4-1)r^*(M/4-1+\tilde{\tau})r(3M/4-1+\tilde{\tau}) + h(M/4)h(3M/4)r^*(M/4+\tilde{\tau})r(3M/4+\tilde{\tau})$$

and $$Q(\tilde{\tau}) = h(3M/4-1)^2|r(M/4-1+\tilde{\tau})|^2 + h(3M/4)^2|r(M/4+\tilde{\tau})|^2 + h(M/4-1)|r(3M/4-1+\tilde{\tau})|^2 h(M/4)^2|r(3M/4+\tilde{\tau})|^2$$

Figure 12:
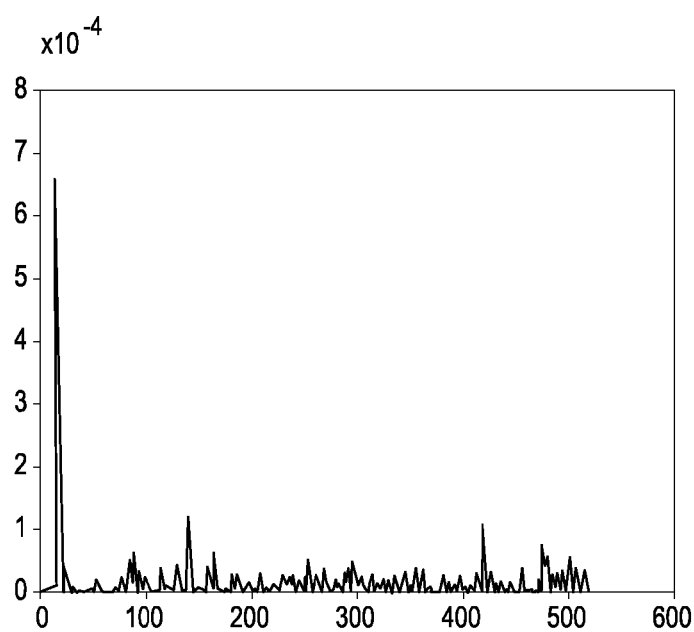
FIG. 12 illustrates the cost function of an example of time and/or frequency shift estimators according to the invention.

FIG. 12 illustrates the cost function of this estimator in using a TFL type prototype filter and the length L=M, for a signal-to-noise ratio of 10 dB, a number of carriers M=128, a delay $\tau/T_s=13$ and a frequency shift $\Delta f=0.002$, which amounts to the standardized value $\Delta v=0.256$. This FIG. 12 clearly shows a highly significant peak value for the value of the time shift introduced into the system.

6.3 Generation of Preambles 6.3.1 Generation of Preambles for the Estimation of a Time Shift and a Phase Shift According to the First Embodiment Naturally, other preambles can be used, making it possible to obtain one or more pairs of peak values at output of the frequency/time transformation module at specific positions. Such preambles perform well when they are used for a receiver according to the invention and can also be used by any unspecified classic receiver.

Here below, we propose two examples of algorithms to generate such preambles. It is assumed to this end that the number of carriers M is a power of 2 such that M≥8, the length of the prototype filter is L=M and similarly the number of non-zero preamble symbols $P_{m,n}$ is limited to M, giving only one column of preamble symbols at a given point in time. As already indicated, if a lengthier prototype filter is used, it is enough to add columns of zero preamble symbols in the preamble to separate it from the payload data.

On these assumptions, only the preamble symbols $p_{m,o}$ corresponding to the column of preamble symbols at the instant n=0, also called pilots, must be taken into account and the signal at output of the frequency/time transformation module can be written, in considering at input and output only discrete sequences and in removing the need for the time index n, in the following form:

$$u_k = \sum_{m=0}^{M-1} p_m e^{j\frac{2\pi}{M}m(k-(M-1)/2)} e^{j\frac{\pi}{2}m}$$

which after simplification gives:

$$u_k = \sum_{m=0}^{M-1} p_m e^{-j\frac{\pi}{2}m} e^{j\frac{\pi m}{M}} e^{j\frac{2\pi mk}{M}}$$

$$= \sum_{m=0}^{M-1} p_m e^{j\theta_{m,k}}$$

with $$\theta_{m,k} = -\frac{\pi}{2}m + \frac{\pi m}{M} + 2\pi\frac{mk}{M}.$$

The determining of the preambles can be implemented by:
searching for the values of the pilots producing one or more pairs of peak values $u_k$ with maximum values (at output of the frequency/time transformation module);
assuming initially that the pilots are either pure real values or pure imaginary values.

Owing to the relationships of symmetry at output of the frequency/time transformation module referred to here above, i.e. $u_{M/2-1-k}=u_k^*$ and $u_{M-1-k}=u_{M/2+k}^*$ for $0\le k\le M/4-1$, the peaks always occur in pairs.

Besides, it is desirable that these pairs of peaks should appear in a limited number to prevent their energy from being dispersed over an excessively great number of outputs $u_k$ of the frequency/time transformation module.

For example, if it is sought to obtain a pair of peak values of maximum amplitude in $k_0$ and $(M/2-1-k_0)$, it is necessary to determine the values of the pilots $p_m$ giving the maximum of the expression $\max_{p_m}|u_{k_0}|^2$. Knowing that $\Sigma_k|u_k|^2=|u_{k_0}|^2$, the choice of the objective function should at the same time ensure that, outside the position of the peak values, the output values $u_k$ of the frequency/time transformation module show low energy.

The two algorithms proposed here below can be used to determine purely real preambles respectively producing one or two pairs of peak values. They can of course extend to the generating of purely imaginary preambles or mixed preambles, combining purely real preamble symbols and purely imaginary preamble symbols or even complex preamble symbols.

5.3.1.1 Determining a Single Pair of Peak Values

As indicated here above, obtaining a peak value (peak) at the output with index $k_0$ of the frequency/time transformation module amounts to maximizing the expression $|u_{k_0}|$.

Now, according to the simplified equation of the value $u_k$ proposed here above, it is noted that all the phases with indices m and M−m, for $1\le m\le M/2-1$, are symmetrical relative to the imaginary axis. Indeed, the quantities $$e^{j\theta_{0,k_0}} \text{ and } e^{j\theta_{M/2,k_0}}$$

are pure real and imaginary values respectively and are equal to 1 and $j(-1)^{k_0}$ in assuming that $M=2^q$ with q≥3 as an integer.

Indeed, the term of the phase with index M−m is such that:

$$\theta_{M-m,k_0} = -\frac{\pi}{2}(M-m) + \frac{\pi(M-m)}{M} + 2\pi\frac{(M-m)k_0}{M}$$

$$\theta_{M-m,k_0} = \frac{\pi}{2}m + \pi - \frac{\pi m}{M} - 2\pi\frac{mk_0}{M}$$

$$= \pi - \theta_{m,k_0}$$

It is therefore possible to write the simplified equation of the value $u_k$ as follows:

$$u_{k_0} = p_0 + j(-1)^k p_{M/2} +$$

$$\sum_{m=1}^{M/2-1} p_m e^{-j\frac{\pi}{2}m} e^{j\frac{\pi m}{M}} e^{j2\pi\frac{mk_0}{M}} - \sum_{m=1}^{M/2-1} p_{M-m} e^{j\frac{\pi}{2}m} e^{-j2\pi\frac{mk_0}{M}}$$

$$u_{k_0} = p_0 + j(-1)^k p_{M/2} + \sum_{m=1}^{M/2-1} \{p_m e^{j\theta_{m,k_0}} - p_{M-m} e^{-j\theta_{m,k_0}}\}$$

If it assumed that the symbols of the preambles $p_m$ have values coming from a constellation derived from a binary phase-shift keying modulation, the problem amounts to determining the signs of the preamble symbols $p_m$.

Now, the pairs of preamble symbols $p_m$ and $p_{M-m}$ that contribute to the sum in the above equation have arguments $\theta_{m,k}$ and $(-\theta_{m,k}+\pi)$ that position them symmetrically relative to the imaginary axis. Therefore, depending on their respective signs, the resulting vector associated with each of these preamble symbols is either a pure real value or a pure imaginary value.

The maximizing procedure can therefore be implemented by the following algorithm:

1) specifying the desired value of the position $k_0$ for the peak value;

2) choosing the signs of the preamble symbols $p_0$ and $p_{M/2}$;

3) computing, for each index m such that $1 \leq m \leq M/2-1$, the value of $\theta_{m,k_0}$ and comparing its projection on the axis of the real values (cosine) and its projection on the axis of the imaginary values (sine) which amounts to testing the following condition: if $|\cos(\theta_{m,k_0})| \geq |\sin(\theta_{m,k_0})|$ then bool(m)=0 else bool(m)=1, where the operator bool represents a two-state variable;

4) if bool(m)=0, assigning opposite signs to the preamble symbols $p_m$ and $p_{M-m}$, i.e. $p_m = -p_{M-m}$. This sign is chosen such that $\text{Sign}(p_m)*\text{Sign}(\cos(\theta_{m,k_0})) = \text{Sign}(p_0)$. If bool(m)=1, assigning the same sign to the preamble symbols $p_m$ and $p_{M-m}$, i.e. $p_m = p_{M-m}$. This sign is chosen such that $\text{Sign}(p_m)*\text{Sign}(\sin(\theta_{m,k_0})) = \text{Sign}((-1)^{k_0} p_{M/2})$.

For example, it is assumed that a search is made to obtain a peak value at the position with index $k_0 = M/4$. We consider preamble symbols such as $p_0 = p_{M/2} = 1$. The associated phase is such that $\theta_{m,k_0} = \pi m/M$, which implies that $|\cos(\theta_{m,k_0})| \geq |\sin(\theta_{m,k_0})|$ for $1 \leq m \leq M/4$ and $|\cos(\theta_{m,k_0})| < |\sin(\theta_{m,k_0})|$ for $M/4+1 \leq m \leq M/2-1$.

In complying with the different steps of the algorithm proposed here above, we obtain the following preamble:

$$p_m = \begin{cases} 1 & \text{for } 0 \leq m \leq 3M/4 \\ -1 & \text{for } 3M/4+1 \leq m \leq M-1 \end{cases}$$

If we consider that the symbols of the preamble can also take imaginary values, it is possible to obtain other even better performing preambles owing to the presence of additional degrees of freedom.

6.3.1.2 Determining Two Pairs of Peak Values

Here below, we propose a second algorithm used to generate a preamble leading to the obtaining of two pairs of peak values at output of the frequency/time transformation module.

It is assumed here that the preamble symbols have a value such that $p_m = \pm 1$, it is sought to determine two pairs of peak values separated by M/2 samples. The two first peak values to be maximized are then localized at the positions $k_0$ and $M/2+k_0$, and the two other values are deduced from relationships of symmetry.

The output of the frequency/time transformation module corresponding to the index $M/2+k_0$ can be expressed as follows:

$$u_{M/2+k_0} = \sum_{m=0}^{M-1} p_m e^{-j\frac{\pi}{2}m} e^{j\frac{\pi m}{M}} e^{j\frac{2\pi m(M/2+k_0)}{M}}$$

$$= \sum_{m=0}^{M-1} (-1)^m p_m e^{-j\frac{\pi}{2}m} e^{-j\frac{\pi m}{M}} e^{j\frac{2\pi m k_0}{M}}$$

By comparing this equation and the simplified equation of the value $u_k$ proposed in relation to the first algorithm, it can be noted that the optimizing (i.e. the maximizing) of the two outputs with indices $k_0$ and $M/2+k_0$ leads to a contradiction at the signs.

Indeed, if identical optimizing choices are made for $u_{k_0}$ and $u_{M/2+k_0}$ (which amounts to fixing the signs of $p_0$ and $p_{M/2}$), it can be noticed that the optimizing of the even-parity indices of m leads to the same distribution of the signs for $u_{k_0}$ and $u_{M/2+k_0}$. However, the optimizing of the odd-parity indices leads to two choices which have opposite signs. Therefore, if a gain is made on the resultant vectors of $u_{k_0}$, there is a loss on the same resultant vector of $u_{M/2+k_0}$ and vice versa.

To obtain peak values of a same amplitude for the values $u_{k_0}$ and $u_{M/2+k_0}$, it is therefore necessary to preserve the optimizing of the even-parity indices and accurately choose the resultant vectors of the odd-parity indices of $u_{k_0}$ and $u_{M/2+k_0}$, so as to maximize the final resultants for having the same amplitude is imposed.

To this end, it is possible first of all to note that the phase with index m (even-parity or odd-parity) and the phase with index M/2+m are shift by $\pi/2$. Indeed, we have:

$$\theta_{M/2+m,k_0} = -\frac{\pi}{2}(M/2+m) + \frac{\pi(M/2+m)}{M} + 2\pi\frac{(M/2+m)k_0}{M}$$

$$\theta_{M/2+m,k_0} = -\frac{\pi}{2}m + \frac{\pi}{2} + \frac{\pi m}{M} + \pi k_0 + 2\pi\frac{m k_0}{M} = \frac{\pi}{2} + \pi k_0 + \theta_{m,k_0}$$

Hence, the phase difference between $\theta_{M/2+m,k_0}$ and $\theta_{m,k_0}$ is $\pm\pi/2$, with a sign that depends on the parity of $k_0$. This means that if we maximize $p_m$ to optimize the outputs $u_{k_0}$ having even-parity indices, the resultant imaginary vector is equal, as a norm, to the real resultant.

It is necessary henceforth to choose the optimal way for adding the resultant vectors of the odd-parity indices, considering that the resultant vectors of $u_{k_0}$ are opposite to those resulting from $u_{M/2+k_0}$, as indicated here above.

In both cases, it can be said that if the optimization of the pair (m, M-m) has a maximum projection on the axis of the real values, then the optimization of the pair (M/2+m,M/2-m) necessarily has a maximum projection on the axis of the imaginary values and vice versa. Now, it can be recalled that the resultant vectors of these two pairs have the same amplitude.

The optimal solution is therefore to obtain a resultant vector of the even-parity indices that is perpendicular to that of the odd-parity indices. This can be done by choosing, for example, the pair $(p_m, p_{M-m})$ which maximizes the real resultant vector of $u_{k_0}$ and the pair $(p_{M/2+m}, p_{M/2-m})$ qui which maximizes the imaginary resultant vector of $u_{M/2+k_0}$.

The optimizing procedure can therefore be implemented by the following algorithm:

1) specifying the value of the position $k_0$ for the peak value and deducing the value of the position $M/2+k_0$;

2) choosing the signs of the preamble symbols $p_0$ and $p_{M/2}$;

3) computing, for each index m such that $1 \leq m \leq M/2-1$, the value of $\theta_{m,k_0}$ and comparing its projection on the axis of real values (cosine) and its projection on the axis of the imaginary values (sine), which amounts to testing the following condition: if $|\cos(\theta_{m,k_0})| \geq |\sin(\theta_{m,k_0})|$ then bool(m)=0 else bool(m)=1, where the operator bool represents a two-state variable;

4) if bool(m)=0:
   if m is an odd-parity value: assigning opposite signs to the preamble symbols $p_m$ and $p_{M-m}$. This sign is chosen in such a way that $\text{Sign}(p_m)*\text{Sign}(\cos(\theta_{m,k_0})) = -\text{Sign}(p_0)$ in a first case, or $\text{Sign}(p_m)*\text{Sign}(\cos(\theta_{m,k_0})) = \text{Sign}(p_0)$ in a second case;

if m is an even-parity value: assigning opposite signs to the preamble symbols $p_m$ and $p_{M-m}$, such that $\text{Sign}(p_m)*\text{Sign}(\cos(\theta_{m,k_0}))=\text{Sign}(p_0)$;

if bool(m)=1:

assigning opposite signs to the preamble symbols $p_m$ and $p_{M-m}$. This sign is chosen such that $\text{Sign}(p_m)*\text{Sign}(\sin(\theta_{m,k_0}))=\text{Sign}((-1)^{k_0}p_{M/2})$ in the first case, or $\text{Sign}(p_m)*\text{Sign}(\sin(\theta_{m,k_0}))=-\text{Sign}((-1)^{k_0}p_{M/2})$ in the second case.

It can be noted that several choices are possible on the final directions of the odd-parity resultants.

For example, it is assumed that it is sought to obtain a peak value at the position with index $k_0=M/4$ and in following the different steps of the algorithm proposed here above, we obtain the same preamble as for the first algorithm by inversing the signs of the odd-parity indices for $1 \leq m \leq M/4-1$ and for $3M/4+1 \leq m \leq M-1$.

Again, as for the first algorithm, if we consider that the preamble symbols can also take imaginary values, it is possible to obtain other even better performing preambles, owing to the presence of additional degrees of freedom.

6.3.2 Generating Preambles for the Estimation of a Time Shift and a Frequency Shift According to the Second Embodiment As mentioned here above, the particular case of the joint estimation of time and frequency shifts requires particular preambles formed by two FBMC/OQAM symbols, of which half of the carriers (even-parity or odd-parity) are zero such that:

the first symbol sent at the instant n=0 such that:

$$\begin{cases} p_{2m,0} = d \text{ with } d \in \mathcal{R} \text{ or } d \in \mathcal{J} \\ p_{2m+1,0} = 0 \end{cases} \text{ and}$$

with $p_{m,n}$ a preamble symbol associated with a sub-carrier with index m a the instant n=0, and $0 \leq m \leq M/2-1$, with M the number of sub-carriers of an OQAM symbol of said multi-carrier signal, the value of d being capable of being adjusted as a function of a compromise between the performance of the estimator and the PAPR (peak to average power ratio) value or a peak factor of the multi-carrier signal sent;

while the following symbol sent at the instant n=1 corresponds to a zero symbol such that:

$p_{m,1}=0$, for $0 \leq m \leq M-1$.

The shape of the above preamble corresponds to the preambles known as "even-parity preambles". By contrast, it must be noted that, when zeros are placed at the even-parity indices, the preambles obtained are called "odd-parity" values.

The method for generating preambles for the estimation of a time shift and frequency shift uses the principle explained with reference to the generation of preambles for the estimation of a time shift and a phase shift and especially the relationships of symmetry at output of the frequency/time transformation module explained here above, i.e. $u_{M/2-1-k}=u_k^*$ and $u_{M-1-k}=u_{M/2+k}^*$ for $0 \leq k \leq M/4-1$, implying that the peaks occur always in pairs.

Besides, the type of particular preambles explained here above and required for the estimation of a time shift and a frequency shift implies an additional symmetry given by:

$u_k=u_{M/2+k,n}$ for $0 \leq k \leq M/2-1$ (11).

As a consequence, such a preamble implies at least two pairs of peak values.

When it is desired to obtain exactly two pairs of peak values, the invention uses the algorithm implementing the maximizing method used to determine a single pair of peak values, relating to the estimation of a time shift and a phase shift as explained here above (paragraph 5.3.1.1) according to two approaches:

implementing steps 1 to 4 of the algorithm and adding a step 5) setting the pilots of odd-parity indices at zero, i.e. $p_{2m+1,0}=0$, in order to prevent the performance of unnecessary computations, the step 3 is performed in considering only values of m that are even-parity or odd-parity values.

It must be noted that the algorithm implementing the maximizing procedure used to determine two pairs of peak values pertaining to the estimation of a time shift and a phase shift as described in detail here above (paragraph 5.3.1.2), does not make it possible to produce more pairs of peak values for the particular preamble required for estimating a time shift and a frequency shift. Indeed, owing to the relationship of symmetry (11), the additional peak values obtained are found in the same positions but with lower amplitudes.

Thus, a single algorithm is implemented for the estimation of a time shift and a frequency shift, this algorithm giving, at the even-parity positions, a value equal to $\pm d$ according to the values of m, with d being a pure real value or a pure imaginary value.

Figure 10:
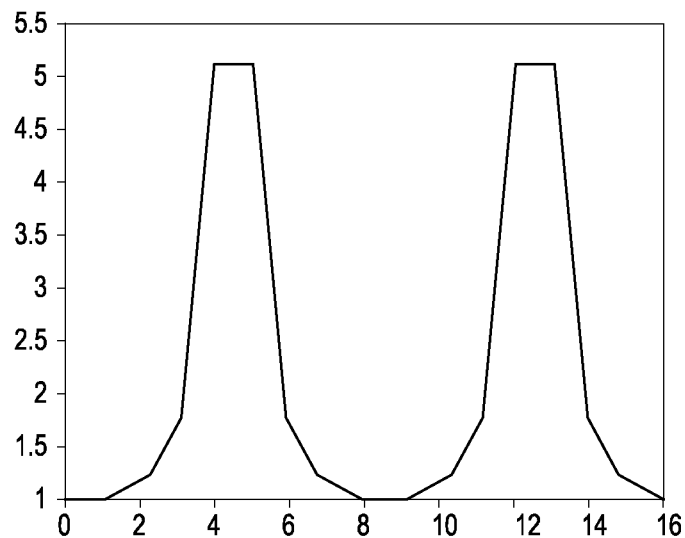
FIGS. 10 and 11 represent the amplitude of the outputs of the frequency/time transformation module for a preamble required for estimating a time and/or frequency shift.
Figure 11:
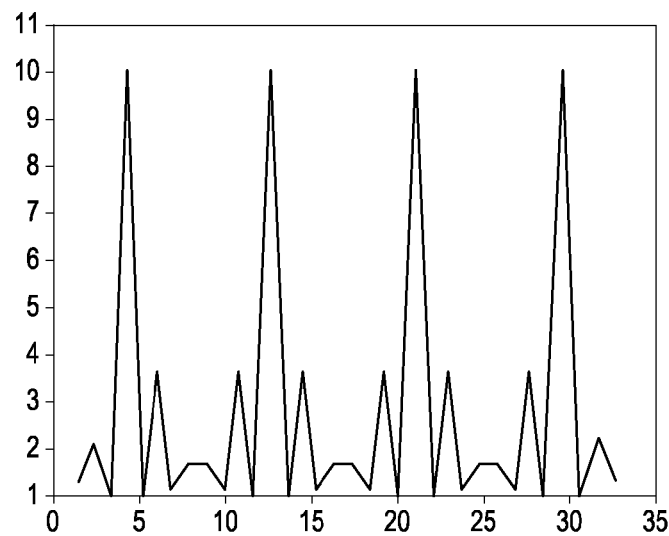

Such preambles are illustrated by FIGS. 10 and 11 respectively for a number of carriers M=16 and for k=M/4−1, or for a number of carriers M=32 and for k=M/8−1, where the X axis represents the indices of the outputs of the frequency/time transformation module and the Y axis represents the amplitude of the preamble at output of the frequency/time transformation module.

In particular, when a number of carriers M=32 and for k=M/8−1, the algorithm for generating preambles relating to the estimation of a time shift and a frequency shift delivers a preamble such that:

$\{p_{2m,0}\}=\{1,1,-1,-1,1,-1,-1,1,1,-1,-1,1,-1,-1,1,1\}$.

6.4 Effect of the Prototype Filter

Figure 1:
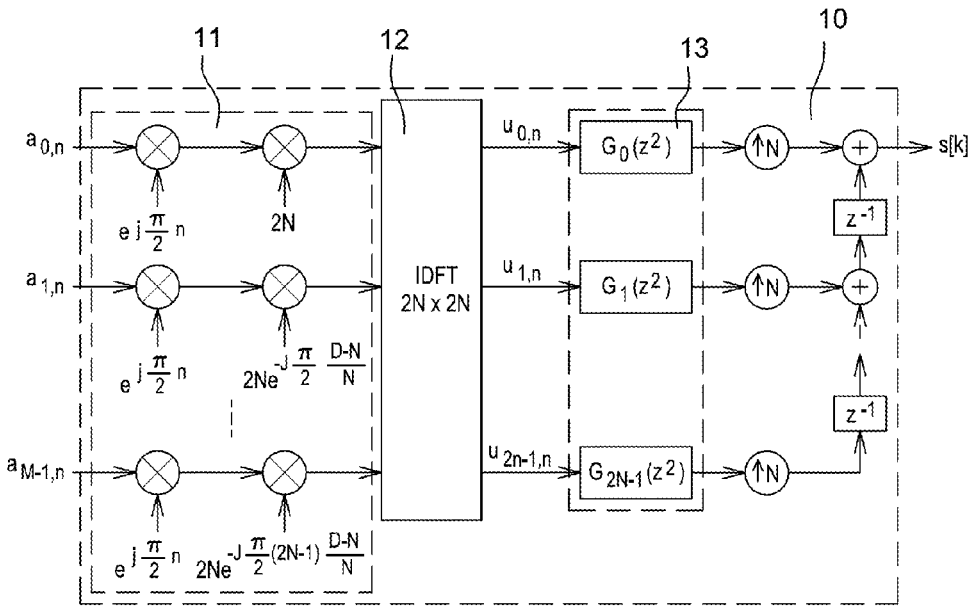

If we consider again the scheme of the FBMC/OQAM modulator of FIGS. 1 and 2, it is seen that the data symbols obtained at output of the pre-processing module 11 and entering the frequency/time transformation module 12 depend on the time lag D introduced by the prototype filter.

Now, to have the three relationships of conjugation presented with reference to the second type of preamble, namely:

$$\begin{cases} u_{k,n} = (-1)^n u_{M/2-k-1,n}^* & \text{for } 0 \leq k \leq M/4-1 \\ u_{M/2+k,n} = (-1)^n u_{M-k-1,n}^* & \text{for } 0 \leq k \leq M/4-1 \\ u_{k,n} = (-1)^n u_{M-k-1,n}^* & \text{for } 0 \leq k \leq M/2-1 \end{cases}$$

it is necessary that the time lag D should be such that D=qM−1, with q an integer greater than or equal to 1 (which corresponds to L=qM for the OFDM/OQAM case).

Furthermore, to be able to use the third estimator $\hat{\tau}_{LS_3}$ defined in the equation (5), the length of the preamble should be equal to the length of the prototype filter. Therefore, and by way of an example, for a length L=qM, the preamble should be formed by 2q columns of preamble symbols (corresponding to the points in time n, n+1, . . . , n+2q−1). As described here above, the first column of preamble symbols comprises specific pilots and the other 2q−1 columns of preamble symbols have zero values.

The inventors of the present patent application have noted that the prototype filter used at transmission has a direct influence on the performance of the estimators. Indeed, to preserve a high amplitude of peak values obtained at output of the frequency/time transformation module, these values must be filtered (i.e. multiplied) by filtering coefficients which are not negligible relative to the other coefficients. Thus, if the peak obtained has to be filtered by a low-value coefficient, it is desirable to increase the size of the preamble to shift the position of this peak.

It is of course possible to use the first estimator $\hat{\tau}_{LS_1}$ defined in the equation (3) and the second estimator $\hat{\tau}_{LS_2}$ defined in the equation (4) for prototype filters of a length L=qM in using the preambles defined here above, possibly by adding only one column of zero preamble symbols.

However, it is well known that the most significant coefficients of most prototype filters localized in time and in frequency are distributed on the M/2 coefficients that are around the centre of these prototype filters.

As a consequence, in using for example the preambles according to the second or third examples above and the corresponding reduced estimators, it is possible to derive benefit from one of the two pairs of peak values obtained at the positions {M/4−1,M/4} or {3M/4−1,3M/4} at output of the frequency/time transformation module in adding q−1 columns of zero-preamble symbols to the preamble and by filtering the preamble by the coefficients h[qM/2−M/4−1] and h[qM/2−M/4].

Figure 4:
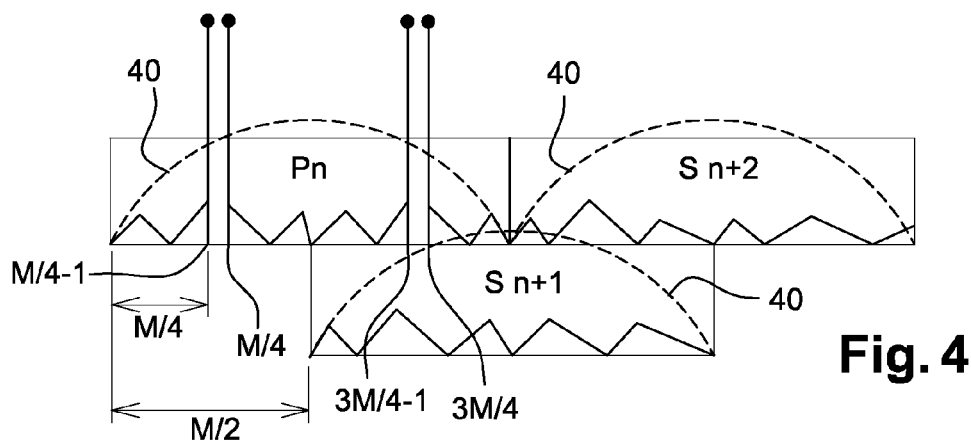
FIGS. 4 and 5 illustrate the effect of the prototype filters on the peak values obtained as outputs of the frequency/time transformation module for specific preambles.

For example, FIG. 4 illustrates the peak values obtained at the positions {M/4−1,M/4} and {3M/4−1,3M/4} at output of the frequency/time transformation module before filtering, in using the preamble Pn sent at the instant n according to the third example described here above, namely:

$$\begin{cases} p_{2m,n} = \sqrt{2}/2 \\ p_{2m+1,n} = 0 \end{cases} \text{ for } 0 \le m \le M/2 - 1$$

We consider a prototype filter 40 illustrated in dashes with a length L=M. The peak values will therefore be filtered by the coefficients {h[M/4−1],h[M/4],h[3M/4−1],h[3M/4]} of the prototype filter which have fairly large amplitudes to preserve the peak values once the signal is sent.

It can be noted that the M/2 first samples of the multi-carrier signal sent (corresponding to the preamble for which the first pair of peak values is a part) preserve a relationship of conjugation (plus or minus one coefficient) even if the following OQAM multi-carrier symbol sent at the instant n+1, denoted as Sn+1, is not zero. As a consequence, the first estimator $\hat{\tau}_{LS_1}$ defined in the equation (3) can be used. By contrast, the M/2 following samples lose the relationships of conjugation if the symbol Sn+1 is not zero and the second estimator $\hat{\tau}_{LS_2}$ defined in the equation (4) cannot be applied.

Figure 5:
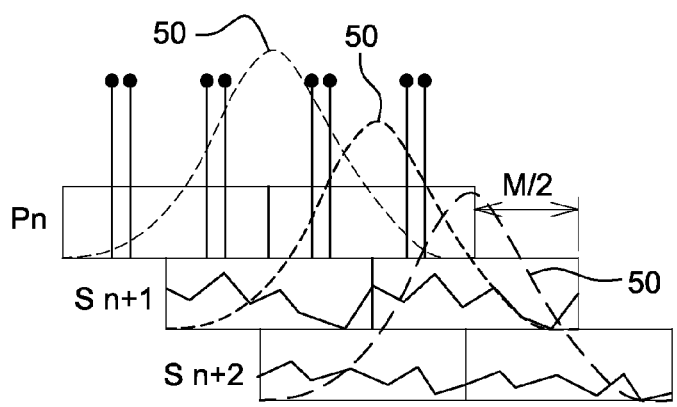

FIG. 5 illustrates another example of peak values obtained at the positions at output of the frequency/time transformation module before filtering, in using a preamble Pn sent at the instant n according to the third example described here above and in considering a prototype filter 50 illustrated in dashes having a length L=qM=2M.

It can be noted that, for the M/2 first samples of the multi-carrier signal sent (corresponding to the preamble for which the first pair of peak values corresponding to the positions {M/4−1,M/4} is a part), the first pair of peak values will be weakened because of filtering by low-amplitude coefficients. It is therefore preferable to use the second pair of peak values (corresponding to the positions {3M/4−1,3M/4}), which is filtered by a pair of high-amplitude coefficients {h[3M/4−1],h[3M/4]}, to estimate the time shift.

In particular, for the second pair of peak values not to be disturbed by the OQAM multi-carrier symbol sent at the following instants, the OQAM multi-carrier symbol sent at the instant n+1, denoted as Sn+1, is preferably zero. It can be noted however that, in the case illustrated in FIG. 5, even if the symbol Sn+1 is not zero, the disturbance caused by the samples of this symbol Sn+1 is not too inconvenient because these samples, which will get added to the peak values, are filtered by low-value.

More generally, it is noted that the first pair of peak values is preferably used for computing the estimator reduced for q as an odd-parity value and that the second pair of peak values is preferably used for the computation of the estimator reduced for q as an even-parity value.

As a consequence, it is possible to generalize the reduction of the first estimator defined in the equation (3) and the second estimator defined in the equation (4) whatever the value of q, as an integer greater than or equal to 1, by the following equation:

$$\hat{\tau}_{LS_4} = \underset{\tilde{\tau}}{\mathrm{argmax}} |r(qM/2 - M/4 - 1 + \tilde{\tau})r(qM/2 - M/4 + \tilde{\tau})|$$

Figure 6:
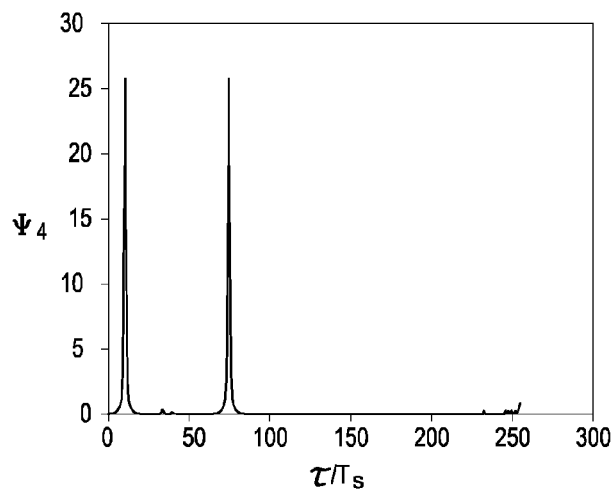
FIGS. 6 and 7 illustrate the cost functions of two examples of phase and/or time shift estimators according to the first embodiment of the invention.

FIG. 6 illustrates the cost function $\Psi_4$ of this estimator by using a TFL type prototype filter with a length L=4M, for a signal-to-noise ratio of 15 dB, a number of carriers M=128, a delay τ/Ts=10 and a preamble according to the third example described here above.

This FIG. 6 shows two peaks at a distance of M/2 samples. The first peak is due to the multiplication of the two maximum values obtained at output of the frequency/time transform module localized at the positions {3M/4−1,3M/4}, and filtered by the coefficients of the prototype filter {h[qM/2−M/4−1], h[qM/2−M/4]}. The second peak is due to the multiplication of the two maximum values obtained at output of the frequency/time transform module localized at the positions {M/4−1,M/4}, and filtered by the coefficients of the prototype filter {h[qM/2+M/4−1],h[qM/2+M/4]}, which is equivalent to τ+M/2 in the fourth estimator $\hat{\tau}_{LS_4}$. It can be noted that the relationship h[qM/2+M/4]s[qM/2+M/4−1]=h[qM/2+M/4−1]s*[qM/2+M/4] remains valid even if we add q−1 columns of zero-preamble symbols in the preamble because the $q^{th}$ column will have no effect on the peak values {M/4−1,M/4} of the preamble after filtering, these peak values being situated in the first half of the outputs of the frequency/time transformation module.

It is also possible to derive benefit from the two pairs of peak values obtained at output of the frequency/time transformation module at the positions {M−1,0} or {M/2−1,M/2}, by using for example the preamble according to the fourth example here above and the corresponding reduced estimators.

In this case, the two pairs of peak values obtained at the above-mentioned positions must be filtered by filtering coefficients {h[qM/2−1],h[qM/2]}, and it is necessary to add q columns of zero M preamble symbols into the preamble.

More generally, it is observed that the pair of peak values corresponding to the positions {M−1,0} is preferably used in the computation of the estimator reduced for q as an even-parity value and that the pair of peak values corresponding to the positions {M/2−1,M/2} is preferably used for the computation of the estimator reduced to q as an odd-parity value.

As a consequence, it is possible to generalize the reduction of the first estimator defined in the equation (3) and of the second estimator defined in the equation (4), whatever the value of q as an integer greater than or equal to 1, by the following equation:

$$\hat{\tau}_{LS_5} = \underset{\tilde{\tau}}{\mathrm{argmax}} |r(qM/2 - 1 + \tilde{\tau}) r(qM/2 + \tilde{\tau})|$$

Figure 7:
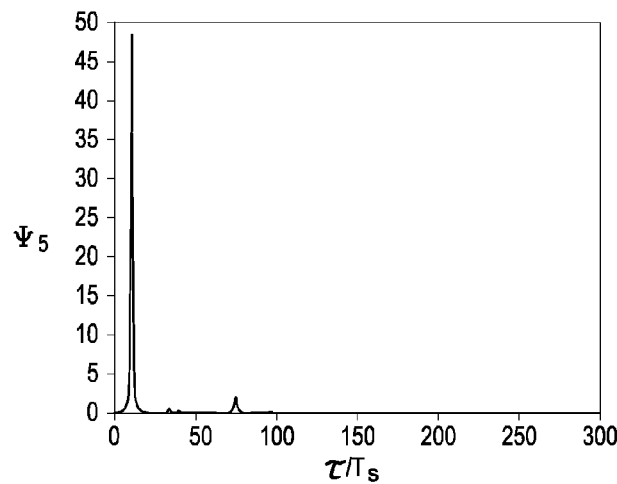

FIG. 7 illustrates the cost function $\Psi_5$ of this estimator in using a TFL type prototype filter with a length L=4M, for a signal-to-noise ratio of 15 dB, a number of carriers M=128, a delay $\tau/T_s=10$ and a preamble according to the fourth example described here above.

If we add q−1 columns of zero-preamble symbols to the preamble, we obtain practically the same performance in terms of cost because the payload OQAM multi-carrier symbol following the preamble, corresponding to the column of payload data symbols at the instant q, which will get added to the preamble, will be filtered by the M first coefficients of a prototype filter which generally have low amplitude as compared with the following M coefficients.

Figure 8:
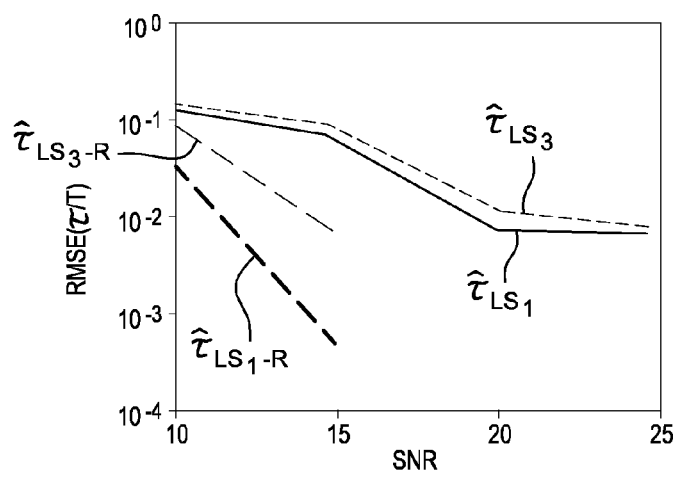
FIGS. 8 and 9 show the performance values obtained by using examples of phase and/or time shift estimators according to the first embodiment of the invention.
Figure 9:
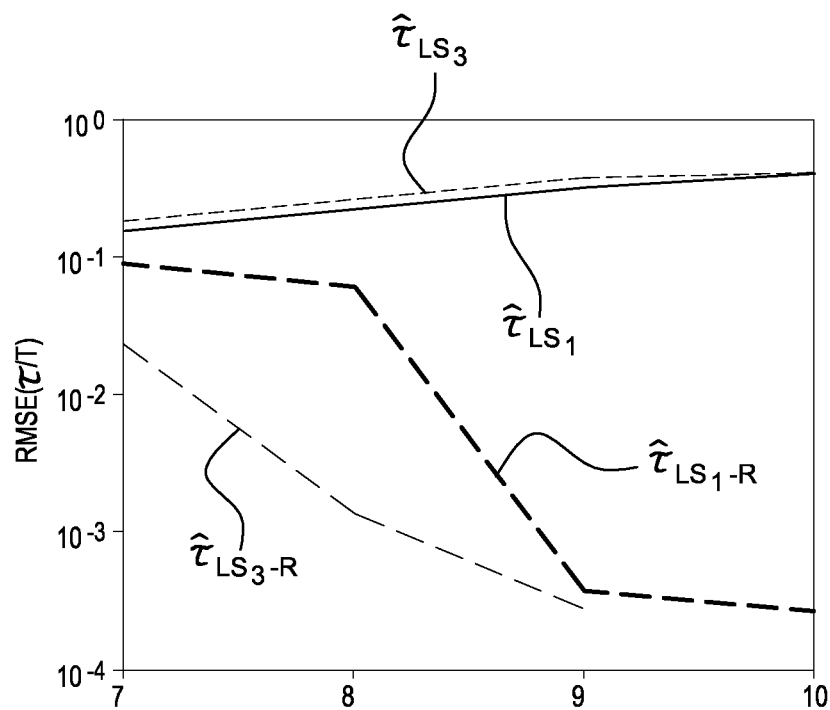
Figure 13:
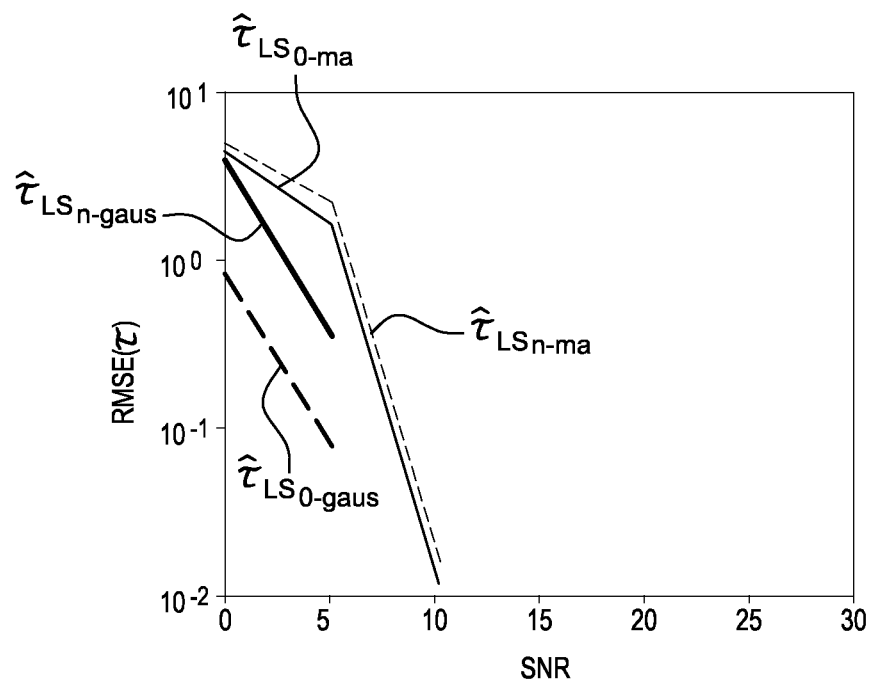
FIG. 13 shows the performance values obtained by using examples of time and/or frequency shift estimators according to the invention.

The performance of the estimators according to the invention is presented with reference to FIGS. 8 and 9 for the estimators relating to the estimation of a time shift and a phase shift according to the first embodiment, and to FIG. 13 for the estimators of a time shift and a frequency shift estimation according to the second embodiment.

More specifically, FIG. 8 proposes a comparison between the first estimator $\hat{\tau}_{LS_1}$ defined in the equation (3) and the third estimator $\hat{\tau}_{LS_3}$ defined in the equation (5), before and after simplification in using the preambles according to the second type of preamble presented. The first reduced estimator $\hat{\tau}_{LS_1}$ by using the first preamble according to the fourth example is denoted as $\hat{\tau}_{LS_1-R}$. The third reduced estimator $\hat{\tau}_{LS_3}$ by using the preamble according to the third example is denoted as $\hat{\tau}_{LS_3-R}$.

The curves obtained illustrate the performance of the estimators after simplification in terms of root mean square error (RMSE) relative to the signal-to-noise ratio (SNR). The performance of the reduced estimators is due especially to the improvement of their robustness against the effect of a multipath channel and Gaussian noise, in eliminating the most disturbed samples.

The root mean square error is expressed here in the following form:

$$RMSE(\tau/T) = \frac{1}{M}\sqrt{\frac{1}{re}\sum_{i=1}^{re}(\tau - \hat{\tau}_i)^2}$$

where re is the number of realizations, $\hat{\tau}_i$ the estimated value of the delay $\tau$ at the $i^{th}$ iteration and T is the symbol time (with T=M in discrete values).

According to FIG. 8, the first reduced estimator $\hat{\tau}_{LS_1-R}$ by using the first preamble according to the fourth example is the best performing estimator.

FIG. 9 illustrates the performance of the same estimators in terms of RMSE as a function of the number of carriers for a signal-to-noise ratio of 10 bB and in the presence of an Ma type transmission channel. The estimators always show a gain after reduction. The first reduced estimator $\hat{\tau}_{LS_1-R}$ by using the preamble according to the fourth example is always the best performing preamble because the samples which come into the computation of the estimator have the greatest amplitudes after filtering and therefore are the least disturbed during transmission.

In terms of complexity, the first and second estimators defined by the equations (3) and (4) which use the correlation between the first and the second half of the samples of the preambles after filtering are less complex in terms of operational computation than the third estimator defined by the equation (5) using the correlation between all the samples of the preamble. After simplification of these estimators, in using the presence of the peak values after the frequency/time transformation step, the complexity of these estimators becomes negligible.

FIG. 13 illustrates the performance of a time shift estimator according to the first embodiment corresponding to the reduced estimator $\hat{\tau}_{LS_1-R}$ by using the preamble according to the fourth example called $\hat{\tau}_{LS_o}$, and a time shift estimator according to the second embodiment pertaining to the equation (10) called $\hat{\tau}_{LS_n}$, in the presence of a Gaussian noise and in the presence of an Ma type transmission channel.

For the estimator $\hat{\tau}_{LS_o}$, the result is obtained for a preamble such that:

$$\begin{cases} p_{2m,0} = (-1)^m \sqrt{2}/2 \\ p_{2m+1,n} = 0 \end{cases} \text{ for } 0 \le m \le M/2 - 1,$$

$$et\ p_{m,n+1} = 0, \text{ for } 0 \le m \le M - 1$$

This preamble verifies especially the property imperatively required for the estimation of a time shift and a frequency shift according to the second embodiment, since one carrier in every two is zero. The two preambles of the two estimators compared according to the first and second embodiments have thus the same energy.

In presence of a purely Gaussian noise, it appears that the estimator $\hat{\tau}_{LS_n}$ performs better while, in the presence of a Ma type transmission channel, the estimator $\hat{\tau}_{LS_o}$ gives a slight advantage.

6.5 Structure of the Receiver

Finally, referring to FIG. 14, we present the simplified structure of a receiver comprising an OFDM/OQAM or BFDM/OQAM demodulator implementing a technique for receiving according to the example described here above.

Such a receiver comprises a memory 101 comprising a buffer memory, a processing unit 102 equipped for example with a microprocessor μP and driven by the computer program 103 implementing the method for receiving according to the invention.

At initialization, the code instructions of the computer program 103 are for example loaded into a RAM and then executed by the processor of the processing unit 102. The processing unit 102 inputs a multi-carrier signal r[k]. The microprocessor of the processing unit 102 implements the steps of the method for receiving described here above according to the instructions of the computer program 103 to carry out an estimation of the delays in time and/or in phase and/or in frequency affecting the received multi-carrier signal r[k]. To this end, the receiver comprises, in addition to the buffer memory 101, means for estimating comprising at least one time shift estimator, and/or at least one phase shift estimator and/or at least one frequency shift estimator taking account of the coefficients of a prototype filter used at transmission to shape the preamble. These means are driven by the microprocessor of the processing unit 102. Although the present disclosure has been described with reference to one or more examples, workers skilled in the art will recognize that changes may be made in form and detail without departing from the scope of the disclosure and/or the appended claims.

The invention claimed is:

1. A method for receiving an OQAM multicarrier signal comprising:
    estimating, in the time domain, at least one shift, said at least one shift being a time shift or a phase shift of said OQAM multicarrier signal,
    said estimating being implemented by at least one estimator configured to estimate said at least one shift, wherein:
    said at least one estimator is a time estimator when said at least one shift is said time shift,
    said at least one estimator is a phase estimator when said at least one shift is said phase shift, and
    said at least one estimator estimates said at least one shift based on coefficients of a prototype filter used at transmission to shape at least one preamble inserted into said OQAM multicarrier signal.

2. The method for receiving according to claim 1, wherein said estimating implements, in the time domain, a first sub-step of estimating said time shift followed by a second sub-step of estimating said phase shift.

3. The method for receiving according to claim 2, wherein said time estimator implements said first sub-step of estimating said time shift according to one of the following equations:

$$\hat{\tau}_{LS_1} = \underset{\tilde{\tau}}{\operatorname{argmax}} \left| \sum_{k=0}^{M/4-1} h(k)h(M/2-1-k)r(k+\tilde{\tau})r(M/2-1-k+\tilde{\tau}) \right| \text{ and}$$

$$\hat{\tau}_{LS_2} = \underset{\tilde{\tau}}{\operatorname{argmax}} \left| \sum_{k=0}^{M/4-1} h(M-1-k)h(M/2+k)r(M/2+k+\tilde{\tau})r(M-1-k+\tilde{\tau}) \right|$$

and said phase estimator implements said second sub-step of estimating said phase shift according to one of the following equations:

$$\hat{\phi}_{LS_1} = \frac{1}{2} \angle \left\{ \sum_{k=0}^{M/4-1} h(k)h(M/2-1-k)r(k+\hat{\tau})r(M/2-1-k+\hat{\tau}) \right\} \text{ and}$$

$$\hat{\phi}_{LS_2} = \frac{1}{2} \angle \left\{ \sum_{k=0}^{M/4-1} h(M-1-k)h(M/2+k)r(M/2+k+\hat{\tau})r(M-1-k+\hat{\tau}) \right\}$$

with:
$\hat{\tau}_{LS_1}$ or $\hat{\tau}_{LS_2}$ being the estimation of said time shift at output of the time estimator, and
$\hat{\tau}$ being the estimation of the time shift fixed at input of the phase shift estimator;
$\hat{\phi}_{LS_1}$ or $\hat{\phi}_{LS_2}$ being the estimation of said phase shift at output of the phase estimator;
$\angle\{.\}$ being the argument of a complex number;

M being the number of sub-carriers of an OQAM symbol of said OQAM multicarrier signal;
k being an integer such that $0 \le k \le M/4-1$;
$\tilde{\tau}$ being an integer such that $0 \le \tilde{\tau} \le \tilde{\tau}_{max}$ with $\tilde{\tau}_{max}$ being a predetermined maximum value of $\tau$;
h(k) being coefficients of said prototype filter used at transmission;
r(k) being the received OQAM multicarrier signal such that $r(k)=s(k-\tau)e^{j\phi}+b(k)$;
s(k) being a sent multicarrier signal;
b(k) being a Gaussian white noise;
$\tau$ being said time shift of the received OQAM multicarrier signal relative to said sent multicarrier signal;
$\phi$ being said phase shift of the received OQAM multicarrier signal relative to said sent multicarrier signal.

4. The method for receiving according to claim 2, wherein said time shift is estimated using a parameter corresponding to a position of at least one pair of maximum values obtained at transmission for said OQAM multicarrier signal,
    said position being defined relative to the outputs of a step of transformation, from the frequency domain into the time domain implemented at transmission, of a set of data symbols forming said at least one preamble, called preamble symbols.

5. The method for receiving according to claim 4, wherein, for preamble symbols $p_{m,n}$ defined at input of said step of transformation from the frequency domain to the time domain implemented at transmission, by:

$$\begin{cases} p_{m,n} = \sqrt{2}/2 \text{ for } m = 4p \text{ and } m = 1+4p \\ p_{m,n} = -\sqrt{2}/2 \text{ for } m = 2+4p \text{ and } m = 3+4p \end{cases} \text{ and}$$

with $p_{m,n}$ being a preamble symbol associated with a sub-carrier with index m at the instant n, p an integer, and $0 \le m \le M-1$,
said time estimator implements said first sub-step of estimating said time shift according to one of the following equations:

$$\hat{\tau}_{LS_1} = \underset{\tilde{\tau}}{\operatorname{argmax}} |r(\tilde{\tau})r(M/2-1+\tilde{\tau})|,$$

$$\hat{\tau}_{LS_2} = \underset{\tilde{\tau}}{\operatorname{argmax}} |r(M/2+\tilde{\tau})r(M-1+\tilde{\tau})|,$$

with:
$\hat{\tau}_{LS_1}$ or $\hat{\tau}_{LS_2}$ being the estimation of said time shift at output of said time estimator;
M being the number of sub-carriers of an OQAM symbol of said OQAM multicarrier signal;
$\tilde{\tau}$ being an integer such that $0 \le \tilde{\tau} \le \tilde{\tau}_{max}$ with $\tilde{\tau}_{max}$ being a predetermined maximum value of $\tau$;
r(k) being the received OQAM multicarrier signal such that $r(k)=s(k-\tau)e^{j\phi}+b(k)$;
k being an integer,
s(k) being a sent multicarrier signal;
b(k) being a Gaussian white noise;
$\tau$ being a time shift of the received OQAM multicarrier signal relative to the sent multicarrier signal;
$\phi$ being a phase shift of the received OQAM multicarrier signal relative to the sent multicarrier signal.

6. The method for receiving according to claim 4, wherein for preamble symbols $p_{m,n}$ defined at input of said step of transformation from the frequency domain to the time domain implemented at transmission by:

$$\begin{cases} p_{2m,n} = \sqrt{2}/2 \\ p_{2m+1,n} = j\sqrt{2}/2 \end{cases} \text{for } 0 \le m \le M/2 - 1$$

with $p_{m,n}$ being a preamble symbol associated with a sub-carrier with index m at the instant n, and $j^2 = -1$,
said time estimator implements said first sub-step of estimating said time shift according to one of the following equations:

$$\hat{\tau}_{LS_1} = \underset{\tilde{\tau}}{\operatorname{argmax}} |r(M/4 - 1 + \tilde{\tau})r(M/4 + \tilde{\tau})|,$$

$$\hat{\tau}_{LS_2} = \underset{\tilde{\tau}}{\operatorname{argmax}} |r(3M/4 - 1 + \tilde{\tau})r(3M/4 + \tilde{\tau})|,$$

with:
$\hat{\tau}_{LS_1}$ or $\hat{\tau}_{LS_2}$ being the estimation of said time shift at output of said time estimator;
M being the number of sub-carriers of an OQAM symbol of said OQAM multicarrier signal;
$\tilde{\tau}$ being an integer such that $0 \le \tilde{\tau} \le \tilde{\tau}_{max}$ with $\tilde{\tau}_{max}$ being a predetermined maximum value of $\tau$;
r(k) being the received OQAM multicarrier signal such that $r(k) = s(k-\tau)e^{j\phi} + b(k)$;
k being an integer;
s(k) being a sent multicarrier signal;
b(k) being a Gaussian white noise;
$\tau$ being a time shift of the received OQAM multicarrier signal relative to the sent multicarrier signal;
$\phi$ being a phase shift of the received OQAM multicarrier signal relative to the sent multicarrier signal.

7. The method for receiving according to claim 4, wherein, for preamble symbols $p_{m,n}$ defined at input of the step of transformation from the frequency domain to the time domain implemented at transmission by: *

$$\begin{cases} p_{2m,n} = \sqrt{2}/2 \\ p_{2m+1,n} = 0 \end{cases} \text{for } 0 \le m \le M/2 - 1$$

with $p_{m,n}$ being a preamble symbol associated with a sub-carrier with index m at the instant n,
said time estimator implements said first sub-step of estimating said time shift according to one of the following equations:

$$\hat{\tau}_{LS_1} = \underset{\tilde{\tau}}{\operatorname{argmax}} |r(M/4 - 1 + \tilde{\tau})r(M/4 + \tilde{\tau})|,$$

$$\hat{\tau}_{LS_2} = \underset{\tilde{\tau}}{\operatorname{argmax}} |r(3M/4 - 1 + \tilde{\tau})r(3M/4 + \tilde{\tau})|,$$

$$\hat{\tau}_{LS_3} = \underset{\tilde{\tau}}{\operatorname{argmax}} |r(M/4 - 1 + \tilde{\tau})r(3M/4 + \tilde{\tau}) + r(M/4 + \tilde{\tau})r(3M/4 - 1 + \tilde{\tau})|,$$

with:
$\hat{\tau}_{LS_1}$, $\hat{\tau}_{LS_2}$ or $\hat{\tau}_{LS_3}$ being the estimation of said time shift at output of said time estimator;
M being the number of sub-carriers of an OQAM symbol of said OQAM multicarrier signal;
$\tilde{\tau}$ being an integer such that $0 \le \tilde{\tau} \le \tilde{\tau}_{max}$ with $\tilde{\tau}_{max}$ being a predetermined maximum value of $\tau$;
r(k) being the received OQAM multicarrier signal such that $r(k) = s(k-\tau)e^{j\phi} + b(k)$;
k being an integer;
s(k) being a sent multicarrier signal;
b(k) being a Gaussian white noise;
$\tau$ being a time shift of the received OQAM multicarrier signal relative to the sent multicarrier signal;
$\phi$ being a phase shift of the received OQAM multicarrier signal relative to the sent multicarrier signal.

8. The method for receiving according to claim 4, wherein, for preamble symbols $p_{m,n}$ defined at the input of the step of transformation from the frequency domain to the time domain implemented at transmission by:

$$\begin{cases} p_{2m,n} = (-1)^m \sqrt{2}/2 \\ p_{2m+1,n} = 0 \end{cases} \text{for } 0 \le m \le M/2 - 1$$

with $p_{m,n}$ being a preamble symbol associated with a sub-carrier with index m at the instant n said time estimator implements said first sub-step of estimating said time shift according to one of the following equations:

$$\hat{\tau}_{LS_1} = \underset{\tilde{\tau}}{\operatorname{argmax}} |r(\tilde{\tau})r(M/2 - 1 + \tilde{\tau})|,$$

$$\hat{\tau}_{LS_2} = \underset{\tilde{\tau}}{\operatorname{argmax}} |r(M/2 + \tilde{\tau})r(M - 1 + \tilde{\tau})|,$$

$$\hat{\tau}_{LS_3} = \underset{\tilde{\tau}}{\operatorname{argmax}} |r(\tilde{\tau})r(M - 1 + \tilde{\tau}) + r(M/2 - 1 + \tilde{\tau})r(M/2 + \tilde{\tau})|,$$

with:
$\hat{\tau}_{LS_1}$, $\hat{\tau}_{LS_2}$ or $\hat{\tau}_{LS_3}$ being the estimation of said time shift at output of said time estimator;
M being the number of sub-carriers of an OQAM symbol of said OQAM multicarrier signal;
$\tilde{\tau}$ being an integer such that $0 \le \tilde{\tau} \le \tilde{\tau}_{max}$ with $\tilde{\tau}_{max}$ being a predetermined maximum value of $\tau$;
r(k) being the received OQAM multicarrier signal, such that $r(k) = s(k-\tau)e^{j\phi} + b(k)$;
k being an integer;
s(k) being a sent multicarrier signal;
b(k) being a Gaussian white noise;
$\tau$ being a time shift of the received OQAM multicarrier signal relative to the sent multicarrier signal;
$\phi$ being a phase shift of the received OQAM multicarrier signal relative to the sent multicarrier signal.

9. The method for receiving according to claim 4, wherein for preamble symbols $p_{m,n}$ defined at input of the step of transformation from the frequency domain to the time domain implemented at transmission, by:

$$\begin{cases} p_{m,n} = 1 & \text{if } \mod(m, 4) = 0 \\ p_{m,n} = 0 & \text{else} \end{cases} \text{for } 0 \le m \le m - 1$$

with $p_{m,n}$ being a preamble symbol associated with a sub-carrier with index m at the instant n, said time estimator implements said first sub-step of estimating said time shift according to one of the following equations:

$$\hat{\tau}_{LS_1} = \underset{\tilde{\tau}}{\mathrm{argmax}} |r(\tilde{\tau})r(M/2-1+\tilde{\tau}) + r(M/4-1+\tilde{\tau})r(M/4+\tilde{\tau})|$$

$$\hat{\tau}_{LS_2} = \underset{\tilde{\tau}}{\mathrm{argmax}} |r(M/2+\tilde{\tau})r(M-1+\tilde{\tau}) + r(3M/4-1+\tilde{\tau})r(3M/4+\tilde{\tau})|$$

$$\hat{\tau}_{LS_3} = \underset{\tilde{\tau}}{\mathrm{argmax}} |r(\tilde{\tau})r(M-1+\tilde{\tau}) + r(M/4-1+\tilde{\tau})r(3M/4+\tilde{\tau}) +$$
$$r(M/4+\tilde{\tau})r(3M/4-1+\tilde{\tau}) + r(M/2-1+\tilde{\tau})r(M/2+\tilde{\tau})|$$

with:
$\hat{\tau}_{LS_1}, \hat{\tau}_{LS_2},$ or $\hat{\tau}_{LS_3}$ being the estimation of said time shift at output of said time estimator;
M being the number of sub-carriers of an OQAM symbol of said OQAM multicarrier signal;
$\tilde{\tau}$ being an integer such that $0 \leq \tilde{\tau} \leq \tilde{\tau}_{max}$ with $\tilde{\tau}_{max}$ being a predetermined maximum value of $\tau$;
r(k) being the received OQAM multicarrier signal such that $r(k)=s(k-\tau)e^{j\phi}+b(k)$;
k being an integer;
s(k) being a sent multicarrier signal;
b(k) being a Gaussian white noise;
$\tau$ being a time shift of the received OQAM multicarrier signal relative to the sent multicarrier signal;
$\phi$ being a phase shift of the received OQAM multicarrier signal relative to the sent multicarrier signal.

10. A device for receiving an OQAM multicarrier signal comprising:
at least one estimator which estimates, in the time domain, at least one shift, said at least one shift being a time shift or a phase shift of said OQAM multicarrier signal, wherein
said at least one estimator is a time estimator when said at least one shift is said time shift,
said at least one estimator is a phase estimator when said at least one shift is said phase shift, and
wherein said at least one estimator estimates said at least one shift based on coefficients of a prototype filter used at transmission to shape at least one preamble inserted into said OQAM multicarrier signal.

11. A non-transitory computer readable medium comprising a computer program stored thereon and comprising instructions for implementing a method for receiving an OQAM multicarrier signal when the program is executed by a processor of a receiver device, wherein the method comprises:
estimating, in the time domain, at least one shift, said at least one shift being a time shift or a phase shift of said OQAM multicarrier signal, wherein
wherein said estimating is based on coefficients of a prototype filter used at transmission to shape at least one preamble inserted into said OQAM multicarrier signal.

12. A method for receiving an OQAM multicarrier signal comprising:
estimating, in the time domain, at least one shift, said at least one shift being a time shift or a phase shift of said OQAM multicarrier signal,
said estimating being implemented by at least one estimator configured to estimate said at least one shift, wherein:
said at least one estimator is a time estimator when said at least one shift is said time shift,
said at least one estimator is a phase estimator when said at least one shift is said phase shift,
wherein said estimating is based on coefficients of a prototype filter used at transmission to shape at least one preamble inserted into said OQAM multicarrier signal to estimate, in the time domain, said at least one shift, and
wherein said time estimator implements one of the following equations:

$$\hat{\tau}_{LS_1} = \underset{\tilde{\tau}}{\mathrm{argmax}} \left| \sum_{k=0}^{M/4-1} h(k)h(M/2-1-k)r(k+\tilde{\tau})r(M/2-1-k+\tilde{\tau}) \right| \text{ and}$$

$$\hat{\tau}_{LS_2} = \underset{\tilde{\tau}}{\mathrm{argmax}} \left| \sum_{k=0}^{M/4-1} h(M-1-k)h(M/2+k)r(M/2+k+\tilde{\tau})r(M-1-k+\tilde{\tau}) \right|$$

and said phase estimator implements one of the following equations:

$$\hat{\phi}_{LS_1} = \frac{1}{2} \angle \left\{ \sum_{k=0}^{M/4-1} h(k)h(M/2-1-k)r(k+\hat{\tau})r(M/2-1-k+\hat{\tau}) \right\} \text{ and}$$

$$\hat{\phi}_{LS_2} = \frac{1}{2} \angle \left\{ \sum_{k=0}^{M/4-1} h(M-1-k)h(M/2+k)r(M/2+k+\hat{\tau})r(M-1-k+\hat{\tau}) \right\}$$

with:
$\hat{\tau}_{LS_1}$ or $\hat{\tau}_{LS_2}$ being the estimation of said time shift at output of said time estimator, and
$\hat{\tau}$ being the estimation of the time shift fixed at input of the phase shift estimator;
$\hat{\phi}_{LS_1}$ or $\hat{\phi}_{LS_2}$ being the estimation of said phase shift at output of said phase estimator;
$\angle \{ . \}$ being the argument of a complex number;
M being the number of sub-carriers of an OQAM symbol of said OQAM multicarrier signal;
k being an integer such that $0 \leq k \leq M/4-1$;
$\tilde{\tau}$ being an integer such that $0 \leq \tilde{\tau} \leq \tilde{\tau}_{max}$ with $\tilde{\tau}_{max}$ being a predetermined maximum value of $\tau$;
h(k) being coefficients of said prototype filter used at transmission;
r(k) being the received OQAM multicarrier signal such that $r(k)=s(k-\tau)e^{j\phi}+b(k)$;
s(k) being a sent multicarrier signal;
b(k) being a Gaussian white noise;
$\tau$ being said time shift of the received OQAM multicarrier signal relative to said sent multicarrier signal;
$\phi$ being said phase shift of the received OQAM multicarrier signal relative to said sent multicarrier signal.

* * * * *

UNITED STATES PATENT AND TRADEMARK OFFICE
CERTIFICATE OF CORRECTION

PATENT NO. : 9,705,726 B2
APPLICATION NO. : 14/129739
DATED : July 11, 2017
INVENTOR(S) : Youssef Dandach et al.

Page 1 of 1

It is certified that error appears in the above-identified patent and that said Letters Patent is hereby corrected as shown below:

In the Claims

Column 46, Lines 49-50, the portion of Claim 12 reading:
-- $\tilde{\tau}$ being an integer such that $0\ \tilde{\tau}\ \tilde{\tau}_{max}$ with $_{max}$ being a predetermined maximum value of $\tilde{\tau}$; --
Should read:
-- $\tilde{\tau}$ being an integer such that $0 \leq \tilde{\tau} \leq \tilde{\tau}_{max}$ with $\tilde{\tau}_{max}$ being a predetermined maximum value of $\tilde{\tau}$; --

Signed and Sealed this
Seventh Day of July, 2020

Andrei Iancu
*Director of the United States Patent and Trademark Office*